(12) United States Patent
Guzzo et al.

(10) Patent No.: US 11,333,132 B2
(45) Date of Patent: May 17, 2022

(54) SYSTEM AND METHOD FOR LIGHTING PROTECTION SYSTEM INSPECTION

(71) Applicant: General Electric Company, Schenectady, NY (US)

(72) Inventors: Judith Ann Guzzo, Niskayuna, NY (US); Douglas Forman, Niskayuna, NY (US); Todd William Danko, Niskayuna, NY (US); John Robert Hoare, San Mateo, CA (US)

(73) Assignee: General Electric Company, Schenectady, NY (US)

( * ) Notice: Subject to any disclaimer, the term of this patent is extended or adjusted under 35 U.S.C. 154(b) by 74 days.

(21) Appl. No.: 16/851,546

(22) Filed: Apr. 17, 2020

(65) Prior Publication Data

US 2021/0324834 A1     Oct. 21, 2021

(51) Int. Cl.
*F03D 17/00*     (2016.01)
*F03D 80/30*     (2016.01)

(52) U.S. Cl.
CPC .............. *F03D 17/00* (2016.05); *F03D 80/30* (2016.05); *F05B 2240/21* (2013.01); *F05B 2260/83* (2013.01)

(58) Field of Classification Search
CPC ....... F03D 80/30; F03D 17/00; F05B 2260/83
See application file for complete search history.

(56) References Cited

U.S. PATENT DOCUMENTS

| 8,013,619 | B2 |   | 9/2011 | Olson et al. |
| 8,171,809 | B2 |   | 5/2012 | Fritz |
| 9,612,264 | B2 |   | 4/2017 | Bruins et al. |
| 10,401,414 | B2 | * | 9/2019 | Matsushita ............. F03D 17/00 |
| 11,047,368 | B2 | * | 6/2021 | Hoare ................... G06T 19/003 |

(Continued)

FOREIGN PATENT DOCUMENTS

| CN | 109798227 A |   | 5/2019 |   |
| CN | 107762737 B | * | 7/2019 | ............. B64C 39/02 |

(Continued)

OTHER PUBLICATIONS

Search Report dated Jun. 23, 2021 in corresponding PCT Application PCT/US2021/025326 (Year: 2021).*

(Continued)

*Primary Examiner* — Topaz L. Elliott
(74) *Attorney, Agent, or Firm* — Dority & Manning, P.A.

(57) ABSTRACT

A system and method for performing a task on a LPS of a wind turbine includes a robotic testing device having a plurality of clamping arms and a LPS test probe coupled to a robotic end effector. The robotic testing device can be positioned around an outer perimeter of a rotor blade of the wind turbine. A cable, coupled to an up-tower anchor point, is attached to the robotic testing device and extends between the anchor point and a support surface. A lightning receptor of the LPS is between the up-tower anchor point and the tower support surface. As the cable is displaced, the robotic testing device moves to a position at which it is clamped to the rotor blade, adjacent the lightning receptor. The end effector moves to position the test probe in contact with the lightning receptor to conduct the test on the LPS.

23 Claims, 17 Drawing Sheets

(56) References Cited

U.S. PATENT DOCUMENTS

| | | | | |
|---|---|---|---|---|
| 2011/0140060 A1* | 6/2011 | Olson | ..................... | F03D 80/50 |
| | | | | 254/394 |
| 2011/0140724 A1* | 6/2011 | Olson | ................... | H02G 13/00 |
| | | | | 324/722 |
| 2013/0336786 A1 | 12/2013 | Kissinger | | |
| 2015/0135459 A1* | 5/2015 | Lee | ......................... | F03D 80/55 |
| | | | | 15/246 |
| 2017/0248647 A1* | 8/2017 | Matsushita | ............ | G01R 31/52 |
| 2019/0178230 A1 | 6/2019 | Sulzer et al. | | |
| 2019/0249649 A1 | 8/2019 | Bjerge et al. | | |
| 2020/0158091 A1* | 5/2020 | Sen | ......................... | F03D 80/50 |
| 2020/0158094 A1* | 5/2020 | Danko | .................... | F03D 80/50 |
| 2020/0325878 A1* | 10/2020 | Danko | ................. | B62D 57/024 |
| 2021/0017963 A1* | 1/2021 | Hoare | ..................... | F03D 80/50 |

FOREIGN PATENT DOCUMENTS

| | | | |
|---|---|---|---|
| CN | 107762737 B | 7/2019 | |
| DE | 102008019680 A1 | 11/2009 | |
| EP | 2 458 208 A2 | 5/2012 | |
| EP | 3 495 655 A1 | 6/2019 | |
| EP | 3875755 A1 * | 8/2021 | ............. F03D 80/30 |
| JP | 2019138261 A | 8/2019 | |
| KR | 101324977 B1 * | 11/2013 | |
| WO | WO-2017130653 A1 * | 8/2017 | ............. B64C 39/02 |

OTHER PUBLICATIONS

Seo et al., "Design and Stability Analysis of a Novel Wall-Climbing Robotic Platform (ROPE RIDE)", Mechanism and Machine Theory, vol. 70, pp. 189-208, Dec. 2013.

Lee et al., "Wire-Driven Parallel Robotic System and Its Control for Maintenance of Offshore Wind Turbines", 2016 IEEE International Conference on Robotics and Automation (ICRA), pp. 902-908, Sweden, May 16-21, 2016.

Jann Raveling, "A Robot Drone for the Wind Energy Sector", BIBA Bremen Institute, pp. 1-9, Dec. 20, 2018.

Danko, Todd William, et al.; "System and Method for Wind Blade Inspection, Repair and Upgrade"; Pending U.S. Appl. No. 116/192,807, filed Nov. 16, 1018-11-16; 26 Pages.

Danko, Todd William, et al.; "System and Method for Wind Blade Inspection, Repair and Upgrade", Pending U.S. Appl. No. 16/192,810, filed Nov. 16, 2018; 28 pages.

Hoare, John Robert, et al., "Systems and Methods for Maintaining Wind Turbine Blades", Pending U.S. Appl. No. 16/718,904; filed Dec. 18, 2019; 39 pages.

PCT Written Opinion, dated Jun. 23, 2021.

* cited by examiner

SYSTEM AND METHOD FOR LIGHTING PROTECTION SYSTEM INSPECTION

BACKGROUND OF THE DISCLOSURE

The present subject matter relates generally to wind turbines and, more particularly, to a system and method for performing one or more inspection tests on a lightning protection system (LPS) of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

In general, maintenance operations are routinely performed on wind turbine components to ensure the safe and efficient operation of the wind turbine. For example, one such maintenance operation may include performing test on the LPS of a wind turbine, such as continuity test or determining the resistance of the LPS of a wind turbine. As is generally known, wind turbines typically include a LPS having one or more lightning receptors disposed on the exterior of the rotor blades and a lightning conductor coupled to one or more lightning receptor(s) and extending through the wind turbine to a ground located at the base of the tower. Thus, when lightning strikes the rotor blade, the electrical current may flow through the one or more lightning receptor and may be conducted through the lightning conductor to the ground.

Accordingly, to ensure that the LPS is operating properly, one or more tests may be performed to determine whether the electrical circuit formed by the system is open or closed and/or measure the resistance in the lighting conducting system. To perform such test, it is generally necessary for a service/maintenance worker to gain access to the one or more blade lightning receptors of the LPS such that electrical testing equipment may be coupled to the one or more lightning receptors. In continuity testing, the electrical testing equipment is further coupled to a portion of the lightning conductor of the LPS disposed adjacent to the ground. As such, known testing procedures require that the worker be sent up in a crane, basket or other suitable equipment or methods, such as the use of a rope crew, in order to permit access to the lightning receptor. However, such equipment is generally very expensive to procure and operate. Additionally, the process of transporting the worker up to the location of each of the one or more lightning receptors can be very time consuming and can impart undue safety concerns.

Accordingly, there is a need for an effective and low cost system for performing tests, such as one or more of a continuity test and a resistance test, on the LPS of a wind turbine.

BRIEF DESCRIPTION

Aspects and advantages of the disclosure will be set forth in part in the following description, or may be obvious from the description, or may be learned through practice of the disclosure.

In one aspect, the present subject matter discloses a system for performing one or more tasks on a LPS of a wind turbine. The system generally includes a cable having a first end attached to an up-tower anchor point and a robotic testing device. The cable extends toward a tower support surface such that a lightning receptor of the LPS and is generally disposed between the up-tower anchor point and the tower support surface. The robotic testing device includes an attachment mechanism, and a LPS test probe. The attachment mechanism is configured for positioning about at least a portion of an outer perimeter of a rotor blade of the wind turbine and clamped thereto the rotor blade. The LPS test probe is coupled to a robotic end effector. The robotic end effector is moveable to position the LPS test probe in contact with the lightning receptor of the LPS. The system further including one or more tag lines coupled to the robotic testing device and a remote monitoring and control interface. The remote monitoring and control interface is operable to remotely clamp the robotic testing device to the rotor blade and perform the one or more LPS inspection tests. The cable is coupled to the up-tower anchor point such that, the robotic testing device is movable to a position at which the LPS test probe contacts the lightning receptor.

In another aspect, the present subject matter discloses a system for performing one or more inspection tests on a lightning protection system (LPS) of a wind turbine. The system includes a cable having a first end attached to an up-tower anchor point and a robotic testing device. The cable extends toward a tower support surface such that a lightning receptor of the LPS is generally disposed between the up-tower anchor point and the tower support surface. The robotic testing device including a plurality of clamping arms configured to be positioned about at least a portion of an outer perimeter of a rotor blade of the wind turbine and a LPS test probe coupled to a robotic end effector. At least a portion of an inner surface of each of the plurality of clamping arms engages at least a portion of an outer surface of the rotor blade. The robotic end effector includes remote actuation to position the LPS test probe in contact with the lightning receptor of the LPS. The system further including one or more tag lines coupled to the robotic testing device and a remote monitoring and control interface operable to clamp the robotic testing device to the rotor blade, control the end effector and perform one or more LPS tests. The cabler is coupled to the up-tower anchor point such that the robotic testing device is movable to a position at which the LPS test probe contacts the lightning receptor.

In a further aspect, the present subject matter discloses a method for performing one or more tests on a lightning protection system (LPS) of a wind turbine. The method includes coupling a cable at an up-tower anchor point, displacing the cable toward the support surface, coupling a robotic testing device to the cable, displacing the cable such that the robotic testing device is moved to a position between the up-tower anchor point and a support surface, and adjacent a rotor blade of the wind turbine, clamping the robotic testing device to the rotor blade of the wind turbine and contacting a LPS test probe of the robotic testing device to the lightning receptor. The step of coupling the cable at the up-tower anchor point includes coupling such that a lightning receptor of the LPS is generally disposed between the up-tower anchor point and the support surface. The robotic testing device includes one or more tag lines coupled thereto.

These and other features, aspects and advantages of the present disclosure will become better understood with reference to the following description and appended claims.

The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
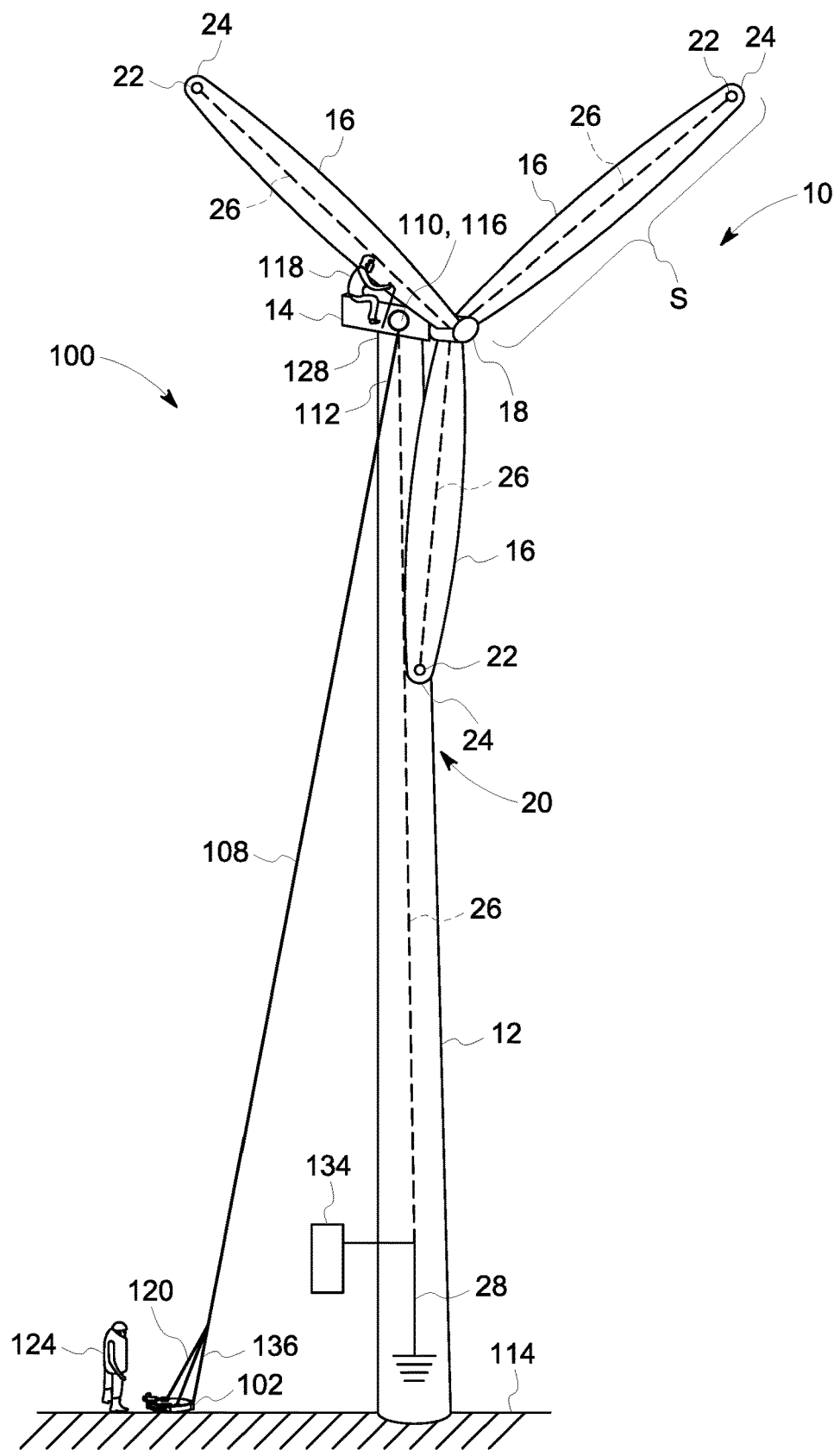
FIG. 1 illustrates a perspective view of an embodiment of a system for performing tests on a LPS of a wind turbine including a robotic testing device, in accordance with one or more embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 2:
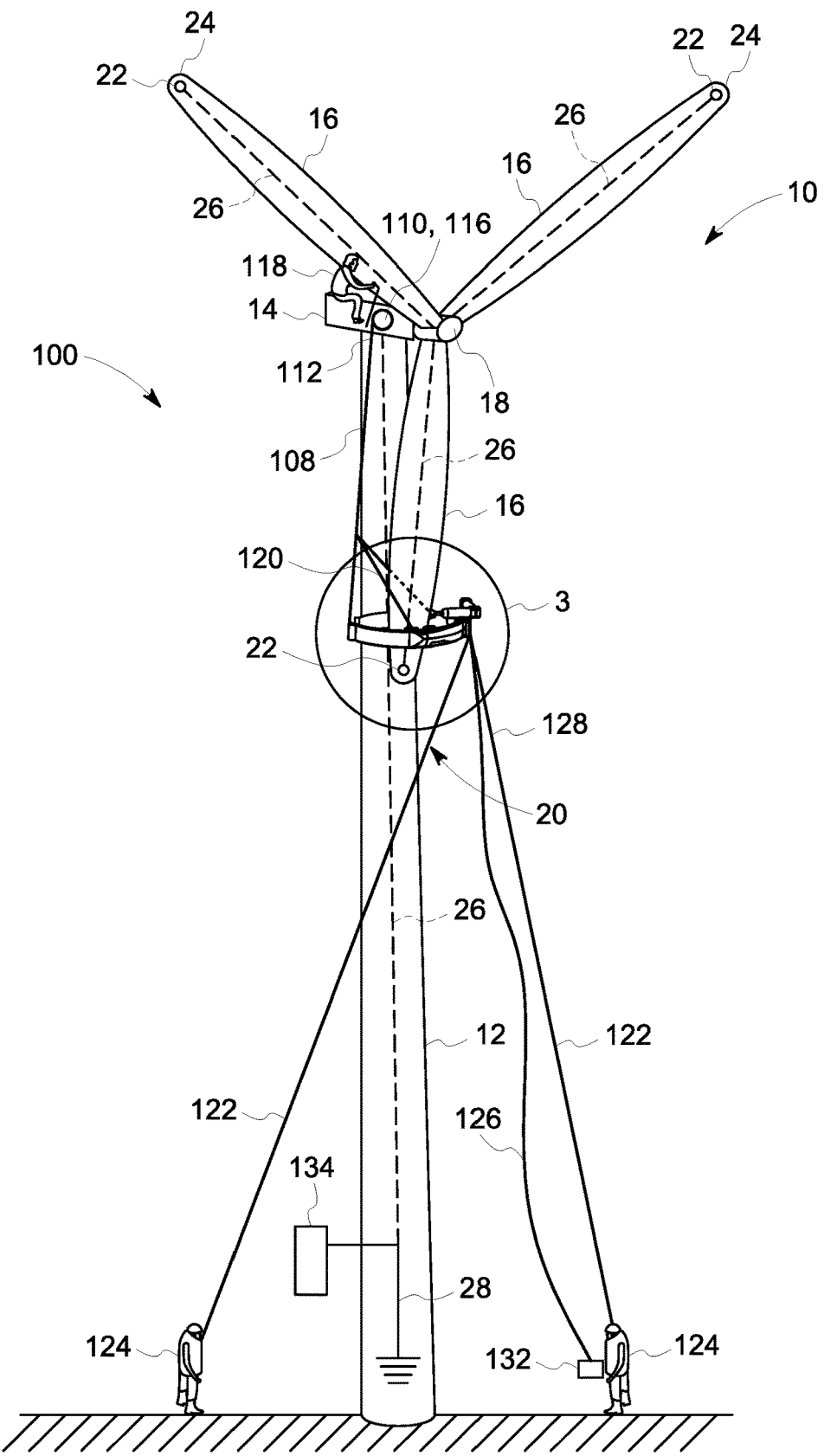
FIG. 2 illustrates a perspective view of the system illustrated in FIG. 1 during the positioning of the robotic testing device adjacent the rotor blade, in accordance with one or more embodiments of the present disclosure.
Figure 3:
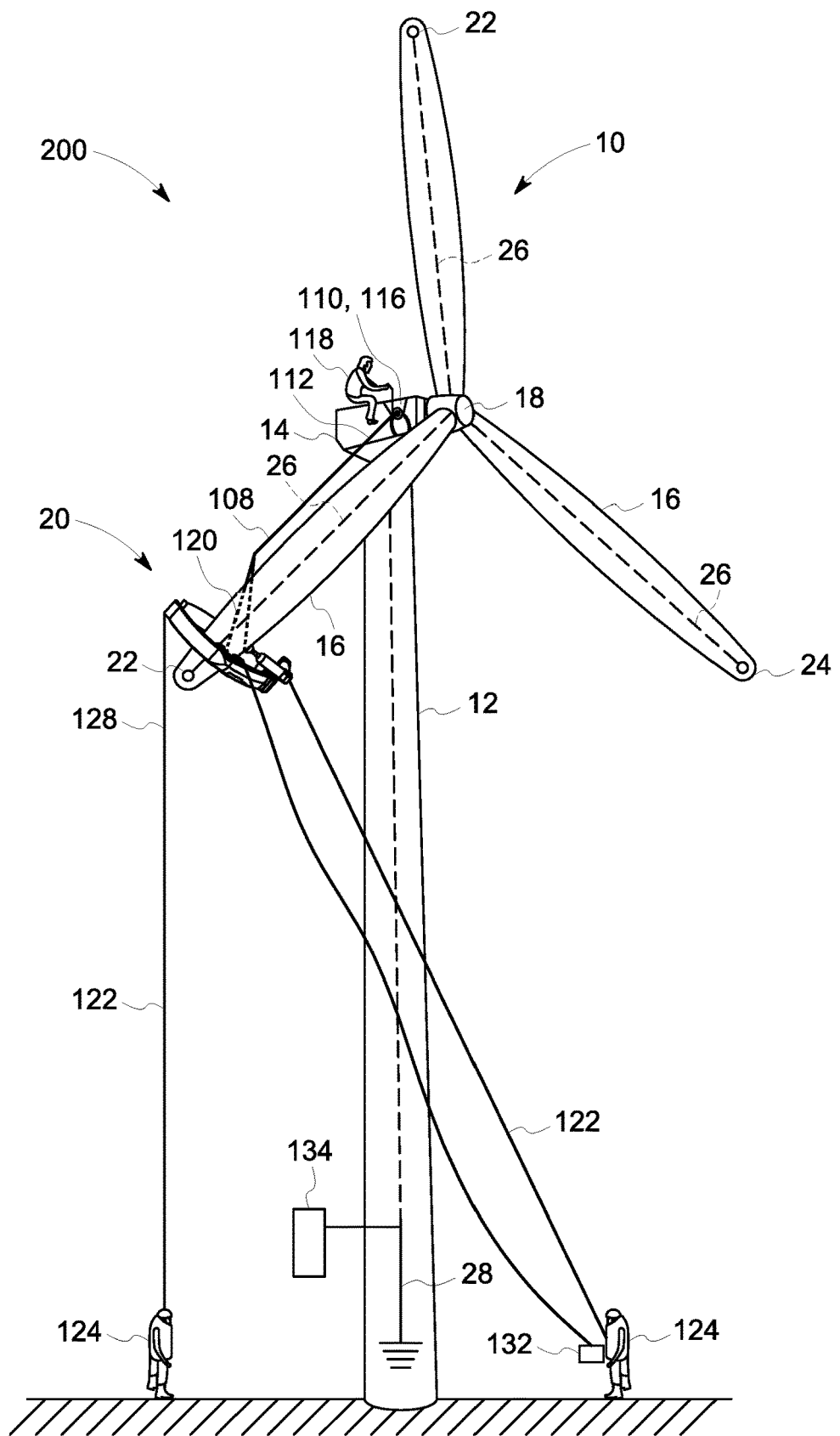
FIG. 3 illustrates a perspective view of another embodiment of a system for performing tests during the positioning of the robotic testing device adjacent the rotor blade, in accordance with one or more embodiments of the present disclosure.
Figure 4:
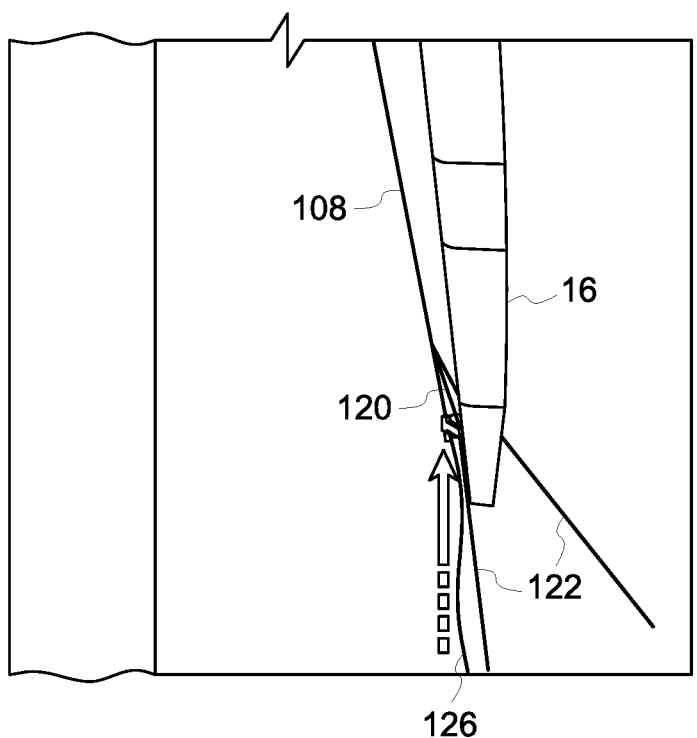
FIG. 4 illustrates a partial perspective view of the system illustrated in FIGS. 1 and 2 during the positioning of the robotic testing device adjacent the rotor blade, in accordance with one or more embodiments of the present disclosure.
Figure 5:
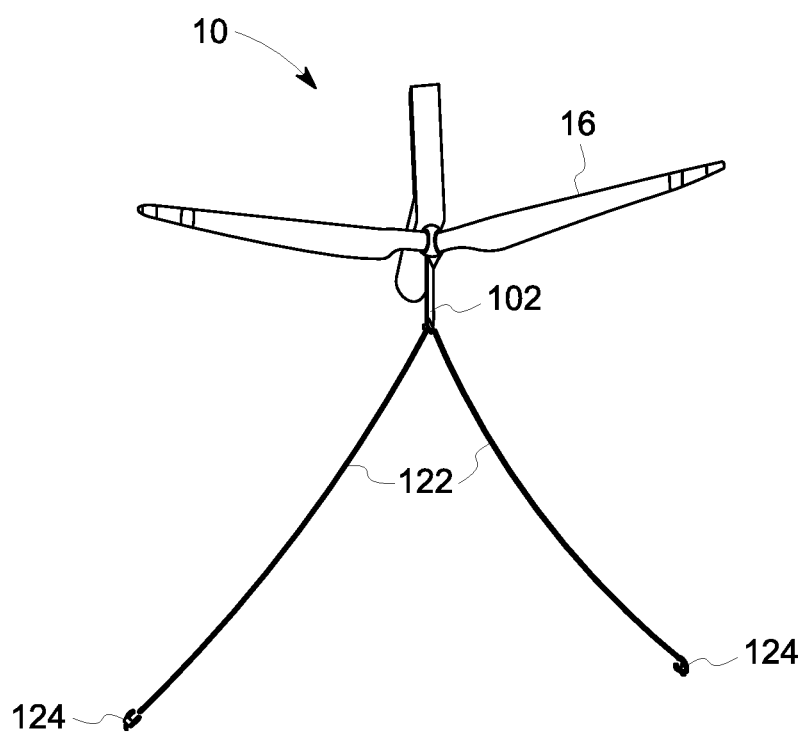
FIG. 5 is an aerial view of the system illustrated in FIGS. 1 and 2 utilizing one or more tag lines during the positioning of the robotic testing device, in accordance with one or more embodiments of the present disclosure.

Referring to the drawings, FIGS. 1-4 illustrate an embodiment of a system 100 for performing a test on the LPS 20 of a wind turbine 10 in accordance with aspects of the present disclosure. In particular, FIG. 1 illustrates a perspective view of one embodiment of the disclosed system 100 prior to hoisting of the robotic testing device up-tower. FIG. 2 illustrates a perspective view of disclosed system 100 of FIG. 1, subsequent to hoisting of the robotic testing device up-tower. FIG. 23 illustrates a perspective view of an alternate system 200, subsequent to hoisting of the robotic testing device up-tower. FIGS. 4 and 5 illustrate a partial, perspective view and an aerial view, respectively, of the embodiment of the system 100 shown in FIGS. 1 and 2. It should be understood that although testing of an LPS is disclosed herein and described in conjunction with the figures, other types of maintenance and testing, such as leading edge (LE) inspection, enhanced inspections beyond visual such as ultra sound, drain hole cleaning, LE cleaning and de-icing, LE protection taping/spraying, repair tasks such as drill and fill, vortex generator installation, lighting damage repair, etc. may utilize a robotic testing device, attachment mechanism, end effector and if necessitated, a tag line configuration as disclosed herein.

Referring particularly to FIG. 1, the illustrated wind turbine 10 generally includes a tower 12 with a nacelle 14 mounted thereon. Additionally, a plurality of rotor blades 16 may be mounted to a rotor hub 18, which may be, in turn, connected to a main flange that turns a rotor shaft of the wind turbine 10. Further, the wind turbine power generation and control components (e.g., a generator and a turbine controller) may generally be housed within the nacelle 14.

The wind turbine 10 may also include the LPS 20 configured to protect the wind turbine 10 and its components from lightning strikes. Specifically, the LPS 20 may include one or more electrically conductive lightning receptors 22 generally disposed on an exterior surface of each rotor blade 16. For example, in one embodiment, the LPS 20 may include a single lightning receptor 22 disposed generally adjacent to the tip 24 of each rotor blade 16. In other embodiments, the LPS 20 may include any number of lightning receptors 22 disposed at any suitable locations along the span "S" (FIG. 1) of each rotor blade 16. It should be appreciated that each lightning receptor 22 may generally be formed from any suitable electrically conductive material so as to permit the one or more electrically conductive lightning receptors 22 to conduct the electrical current resulting from a lightning strike. For example, in one embodiment, the one or more electrically conductive lightning receptors 22 may comprise copper lightning receptors. Additionally, each of the one or more electrically conductive lightning receptors 22 may generally be coupled to a suitable lightning conductor 26 (e.g., a metal wire or any other suitable electrically conducing wire) running from each receptor 22 through the wind turbine 10 to the base of the tower 12, where it is connected to a ground 28. As such, when a lightning strike occurs, the electrical current from the strike may flow through one or more electrically conductive lightning receptors 22 and may be conducted through the lightning conductor 26 to the ground 28 thereby preventing damage to the wind turbine 10.

It should be appreciated that the wind turbine 10 of FIG. 1 is generally provided for illustrative purposes only to place the present subject matter in an exemplary field of use. Thus, one of ordinary skill in the art should appreciate that the disclosed system 100 need be not limited to any particular type of wind turbine configuration or any particular LPS configuration.

To ensure that the LPS 20 is operating properly, one or more tests, such as a continuity test and resistance test, may be performed using the presently disclosed system 100. As shown in FIGS. 1 and 2, the system 100 may generally include a robotic testing device 102 configured for transport vertically relative to the wind turbine 10. In general, the robotic testing device 102 may be configured such that, when properly positioned relative to a rotor blade 16 of the wind turbine 10, a LPS test probe (described presently) of the robotic testing device 102, such as a resistance measurement probe, may form an electrical connection or may otherwise electrically contact one of the one or more electrically conductive lightning receptors 22 disposed on the blade 16. The system 100 may also include a cable 108 secured to the robotic testing device 102. The cable 108 may generally be coupled to an up-tower anchor point 110 on the wind turbine 10, such as on the nacelle 14. More particularly, the cable 108 has a first end 112 coupled to the up-tower anchor point 110. The cable 108 extends from the up-tower anchor point 110 toward a support surface 114 such that the electrically conductive lightning receptor 22 to be contacted by the LPS test probe of the robotic testing device 102 is disposed between the up-tower anchor point 110 and the support surface 114. In an exemplary embodiment, the up-tower anchor point 110 is a winch 116, such as a motorized winch, coupled to the nacelle 14. In another embodiment, the up-tower anchor point 110 may comprise any structure capable of anchoring the cable 108 up-tower, as described herein.

As illustrated in FIG. 1, an up-tower operator 118 positions the cable 108 to the up-tower anchor point 110. In an embodiment, an opening (not shown) may be formed in the nacelle 14 and through which the cable 108 may be passed.

It should also be appreciated that, although the present subject matter is generally described as utilizing the winch 116 to allow the cable 108 to move, slide or otherwise be displaced relative to the up-tower anchor point 110 and the support surface 114, any suitable structure, device and/or configuration may generally be utilized to permit such relative displacement. For example, the cable 108 may be coupled to the wind turbine 10 using another type of motorized device, a sprocket arrangement, or any other suitable device/mechanism that permits the cable 108 to be displaced relative to the anchor point 110. In another embodiment, the cable 108 may be coupled to the wind turbine 10 and/or using a pulley by inserting the cable 108 through a guide ring, guide hook, eyelet or any other suitable structure formed on or attached to the wind turbine 10 and using a pulley system that permits the cable 108 to be displaced between the anchor point 110 and the support surface 114. Various other suitable structures, devices and/or configurations for providing relative displacement of the cable 108 between the up-tower anchor point 110 and the support surface 114 should be apparent to those of ordinary skill in the art. In yet another alternate embodiment, displacement of the cable 108 is not required, and rather the robotic testing unit 102 is configured as a self-climbing robotic unit, meaning that the winch 116 or other device to feed the cable 108 through is on board robotic testing unit 102 and not offboard.

Referring more specifically to FIGS. 1 and 2, in the illustrated embodiment, the plurality of rotor blades 16 are positioned in a manner aligning the rotor blade 16 to be tested in a generally 6 o'clock position with the leading edge toward the tower 12. IN an alternate embodiment, illustrated in FIG. 3, the plurality of rotor blades 16 are positioned in generally upside-down "Y" position, and more specifically, in a manner aligning the rotor blade 16 to be tested in a generally 8 o'clock position with the leading edge facing away from the tower 12.

As shown in FIGS. 1-3, the cable 108 is coupled to the robotic testing device 102. One or more additional cables 120 may be coupled between the robotic testing device 102 and the cable 108 to stabilize and/or guide the robotic testing device 102 during movement of the robotic testing device 102. Thus, when the cable 108 is displaced (such as by winching), the robotic testing device 102 may be raised and/or lowered between the up-tower anchor point 110 and the support surface 114 to a location generally adjacent to the rotor blade 16 such that the LPS test probe of the robotic testing device 102 is positioned to contact and, thus, form an electrical connection with the electrically conductive lightning receptor 22.

As illustrated in FIGS. 2 and 5, prior to displacement of the cable 108 and hoisting of the robotic testing device 102 in an upward direction, such as by winching, one or more tag lines 122, also commonly referred to as pull cords, rap lines, guide lines, or the like, are coupled to the robotic testing device 102 and provide guidance of the robotic testing device 102 during positioning adjacent the rotor blade 16. In the embodiment of FIGS. 1-5, two tag lines 122 are illustrated with each extending from the robotic testing device 102 to a first and second ground operator 124. In an alternate embodiment, one of the two tag lines 122 may be coupled to a fixed anchor point (not shown). In yet another alternate embodiment, a single tag line 122 that extends from the robotic testing device 102 to the ground operator 124 may be utilized. It should be understood that any number of tag lines 122 may be used to provide guidance of the robotic testing device 102 during positioning adjacent the rotor blade 16.

More particularly, in several embodiments, the one or more tag lines 122 of the present subject matter may be anchored to the support surface 114 using any suitable anchoring member which is configured to anchor or otherwise maintain the one or more tag lines 122 on or adjacent to the support surface 114. Thus, in the embodiment shown in FIGS. 2-5, the one or more tag lines 122 may be anchored by a service/maintenance worker, such as the one or more ground operators 124, by having the one or more operators simply hold the one or more tag lines 122. In an alternate embodiment, one or more of the one or more tag lines 122 may be anchored to the support surface 114 using a screw anchor configured to be screwed into or otherwise attached to the support surface 114. In other embodiments, one or more of the one or more tag lines 122 may comprise any other suitable rope anchors, stakes, tie downs or the like which may be removably or non-removably attached to the support surface 114. Alternatively, one or more of the one or more tag lines 122 may be configured to be simply disposed on or adjacent to the support surface 114 (i.e., not attached to the support surface 114). For example, one or more of the one or more tag lines 122 may be anchored to the support surface 114 using a relatively heavy object (e.g., sandbags, liquid filled containers, weights, and/or any other suitable weighted objects), a vehicle (e.g., a work truck) or any other suitable item/object that may serve to anchor or otherwise maintain a portion of the one or more of the one or more tag lines 122 on or adjacent to the support surface 114.

The disclosed system 100 may also include an extension lead 126 (e.g., a metal wire or any other suitable lead formed from an electrically conductive material) having a first end 128 connected to the LPS test probe of the robotic testing device 102 and a second end 130 disposed adjacent the support surface 114 of the wind turbine 10. The extension lead 126 may generally be configured to extend from the LPS test probe of the robotic testing device 102 toward the support surface 114 to permit a service/maintenance worker, such as the one or more ground operators 124, located on or adjacent to the support surface 114 to perform test, such as resistance and/or continuity, of the LPS 20. In particular, when an electrical connection is made between the LPS test probe of the robotic testing device 102 and the lightning receptor 22, an electrical circuit is formed between the extension lead 126 and the ground 28. Thus, it should be appreciated by those of ordinary skill in the art that the electrical properties of the circuit (e.g., the resistance) may then be tested/measured in order to determine whether the LPS 20 is properly conducting electrical current from the one or more electrically conductive lightning receptors 22 through the lightning conductor 26 to the ground 28. For example, as shown in FIG. 2, the electrical properties of the circuit may be measured by coupling a suitable electrical device, such as a remote monitoring and control interface device 132, to the second end 130 of the extension lead 126 and/or coupling the suitable electrical device 132 to the second end 130 of the extension lead 126 and a portion 134 of the lightning conductor 26 disposed adjacent to the ground 28. Specifically, in one embodiment, the electrical device, and more particularly the remote monitoring and control interface device 132 may comprise a multimeter, a specialized resistance tester, a specialized continuity tester or any other suitable electrical testing/measurement device which is configured to supply a voltage through the circuit formed by the LPS 20 and measure current and/or voltage through the circuit such that the resistance may be determined, whether the circuit is opened or closed, or whether the LPS 20 is otherwise functioning properly. In addition, the remote monitoring and control interface device 132 may comprise a user interface providing control of the positioning of the LPS test probe (described presently). In an alternate embodiment, the remote monitoring and control interface device 132 may be provided up-tower and wirelessly operable either onsite, or remotely, such as through a web application, to view camera feed from, collect data, and/or control positioning and functioning of the robotic control device 102.

In order to locate the robotic testing device 102 in a position that permits the LPS test probe to contact one of the electrically conductive lightning receptors 22 of the LPS 20, the cable 108 of the disclosed system 100 may generally be configured such that, as the cable 108 is displaced, such as by the winch 116, the position of the robotic testing device 102 relative to the up-tower anchor point 110 and the electrically conductive lightning receptor 22 to be contacted, may be vertically adjusted. Thus, the cable 108 may generally include the first end 112 coupled to the up-tower anchor point 110 and a second end 136 that is coupled to the robotic testing device 102 by the ground operator 124. For example, as shown in the illustrated embodiment, the first end 112 of the cable 108 may be attached to the up-tower anchor point 110 and, upon displacement of the second end 136 of the cable 108 to the support surface 114, the second end 136 of the cable 108 may be attached to the robotic testing device 102. However, it should be appreciated that the second end 136 of the cable 108 may generally be secured to the robotic testing device 102 at any suitable location and need not be attached to the robotic testing device 102 at the particular location illustrated in FIGS. 1-5.

It should be appreciated that the first end 112 of the cable 108 may generally be attached to the wind turbine 10 to the up-tower anchor point 110, using any suitable means known in the art. Additionally, it should be appreciated that the second end 136 of the cable 108, may be attached to the robotic testing device 102 using any suitable attachment mechanism and/or method. Similarly, to provide further stabilization of the robotic testing device 102, the one or more additional cables 120 may be attached to the robotic testing device 102 and the cable 108 using any suitable attachment mechanism and/or method. For instance, the first end 112 of the cable 108 may be coupled to the nacelle 14, via the winch 116, using an attachment ring or clip (e.g., carabineer). Similarly, the second end 136 of the cable 108, and the one or more additional cables 120, may be attached to the robotic testing device 102 using an attachment ring or clip. However, in alternative embodiments, the first and second ends 112, 136 of the cable 108 may be attached to the anchor point 110 and the robotic testing device 102, respectively, using mechanical fasteners (e.g., screws, bolts, brackets and the like), cables, tape, adhesives or using any other suitable attachment mechanism and/or method. For example, in several embodiments, the second end 136 of the cable 108, and the one or more additional cables 120, may be attached by being tied, clipped, glued, taped, bonded, and/or mechanically fastened to the robotic testing device 102.

In the illustrated embodiment, when the cable 108 is displaced, such as by winching by the winch 116, in a direction towards the up-tower anchor point 110, the robotic testing device 102 is raised vertically relative to the wind turbine 10. Similarly, when the cable 108 is otherwise displaced, such as by the winch 116, in a direction towards the support surface 114, the robotic testing device 102 is lowered vertically relative to the wind turbine 10. Thus, by displacing the cable 108, the vertical positioning of the robotic testing device 102 may be adjusted such that the robotic testing device 102 may be raised and/or lowered to a suitable height for performing the desired test on the LPS 20.

Referring still to FIGS. 1-5, the up-tower anchor point 110 and the support surface 114 may generally define the maximum and minimum vertical positions for the robotic testing device 102, with the cable 108 defining the path along which the robotic testing device 102 may be vertically moved between the up-tower anchor point 110 and the support surface 114. As such, it should be appreciated that the up-tower anchor point 110 is spaced apart from the support surface 114, vertically so that the electrically conductive lightning receptor 22 to be contacted by the LPS test probe is generally disposed between the up-tower anchor point 110 and the support surface 114. For example, as shown in FIGS. 1 and 2, the up-tower anchor point 110 may generally be disposed on or adjacent to the nacelle 14 and the support surface 114 may generally be the surface on which the wind turbine 10 is supported (e.g., the natural ground/earth and/or any man-made surface, such as a concrete pad). Thus, in one embodiment, the robotic testing device 102 may be raised and/or lowered between the support surface 114 and the nacelle 14, thereby permitting the robotic testing device 102 to be moved onto and/or adjacent to any portion of the rotor blade 16 at which the electrically conductive lightning receptor 22 may be located.

In alternative embodiments, it should be appreciated that the up-tower anchor point 110 need not be defined at the location illustrated in FIGS. 1 and 2. For example, the up-tower anchor point 110 may generally be defined at any suitable location on the wind turbine 10 that is disposed up-tower of the electrically conductive lightning receptor 22 to be contacted by the LPS test probe of the robotic testing device 102. As used herein, the term "up-tower" refers to any location on and/or adjacent to a component of the wind turbine 10 that is vertically above the location of the electrically conductive lightning receptor 22 to be contacted when the rotor blade 16 is facing vertically downward (i.e., when the tip 24 of the rotor blade 16 is pointed towards the support surface 114). Thus, in embodiments in which the electrically conductive lightning receptor 22 to be contacted is disposed generally adjacent the blade tip 24, the up-tower anchor point 110 may be disposed on or adjacent to any suitable wind turbine component or any section of a wind turbine component that is disposed up-tower of the tip 24 of the rotor blade 16. Thus, in various embodiments of the present subject matter, the up-tower anchor point 110 may be disposed on or adjacent to the hub 18 and the nacelle 14, as well as on or adjacent to the up-tower sections of the tower 12 and the rotor blades 16.

It should be appreciated that, in properly positioning the robotic testing device 102 adjacent to the rotor blade 16 of the wind turbine 10, the location of the one or more tag lines 122 and the cable 108 may be adjusted along the support surface 114 to permit the vertical path and/or the horizontal positioning of the robotic testing device 102 to be altered as the robotic testing device 102 is moved by the cable 108 and the one or more tag lines 122.

As such, the robotic testing device 102 may be properly oriented with respect to the rotor blade 16 and/or the electrically conductive lightning receptor 22 as the robotic testing device 102 devise is raised, lowered and/or horizontally displaced. For example, the cable 108 and the one or more tag lines 122 may be configured to move the robotic testing device 102 closer to and/or further away from the wind turbine tower 12 and/or to be moved around the circumference of the tower 12 to alter the position of the robotic testing device 102 and, thus, adjust the travel path of the robotic testing device 102 with respect to the rotor blade 16 and/or the electrically conductive lightning receptor 22 to be contacted. In the illustrated embodiment the one or more ground operators 124 serve to horizontally displace the robotic testing device 102 by simply walking along the support surface 114 to permit the rotor blade 16 and/or the electrically conductive lightning receptor 22 to be accessible to the LPS test probe of the robotic testing device 102 as the robotic testing device 10 is raised and/or lowered.

The robotic testing device 102 of FIGS. 1-5 may generally be configured to transport the LPS test probe between the up-tower anchor point 110 and the support surface 114 so as to position the LPS test probe relative to the one or more electrically conductive lightning receptors 22. As such, it should be appreciated that the robotic testing device 102 may generally have any suitable size, shape and/or dimensions that permits the cable 108, the one or more additional cables 120 and the one or more tag lines 122 to be secured thereto, while providing clamping to the rotor blade 16 (described presently).

Figure 6:
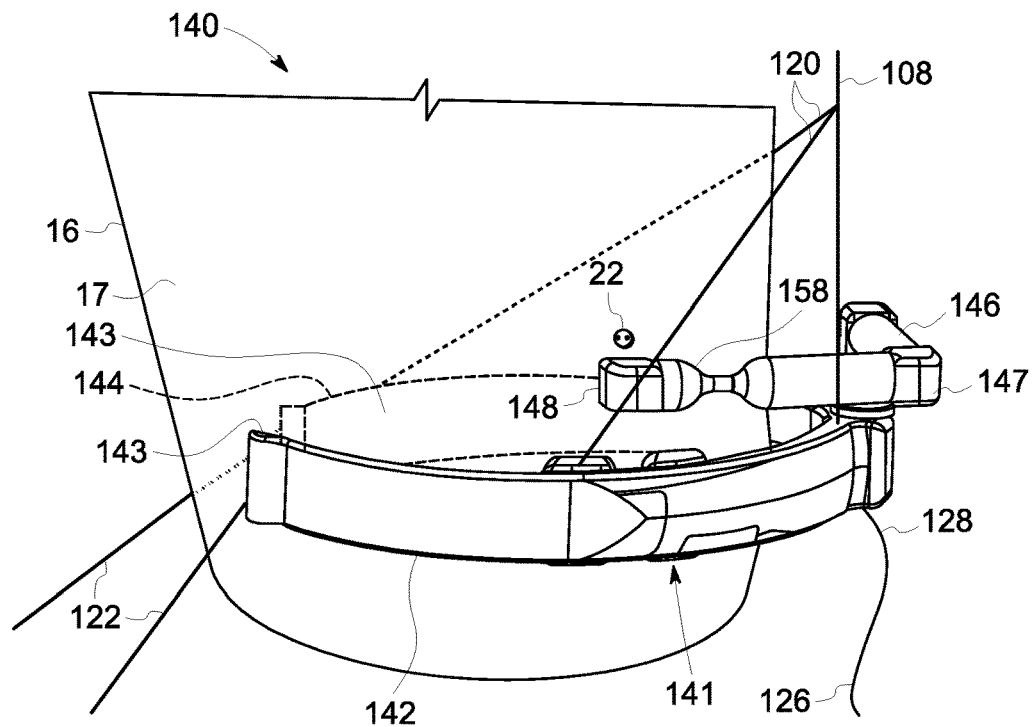
FIG. 6 illustrates a perspective view of one embodiment of a robotic testing device, in accordance with one or more embodiments of the present disclosure.
Figure 7:
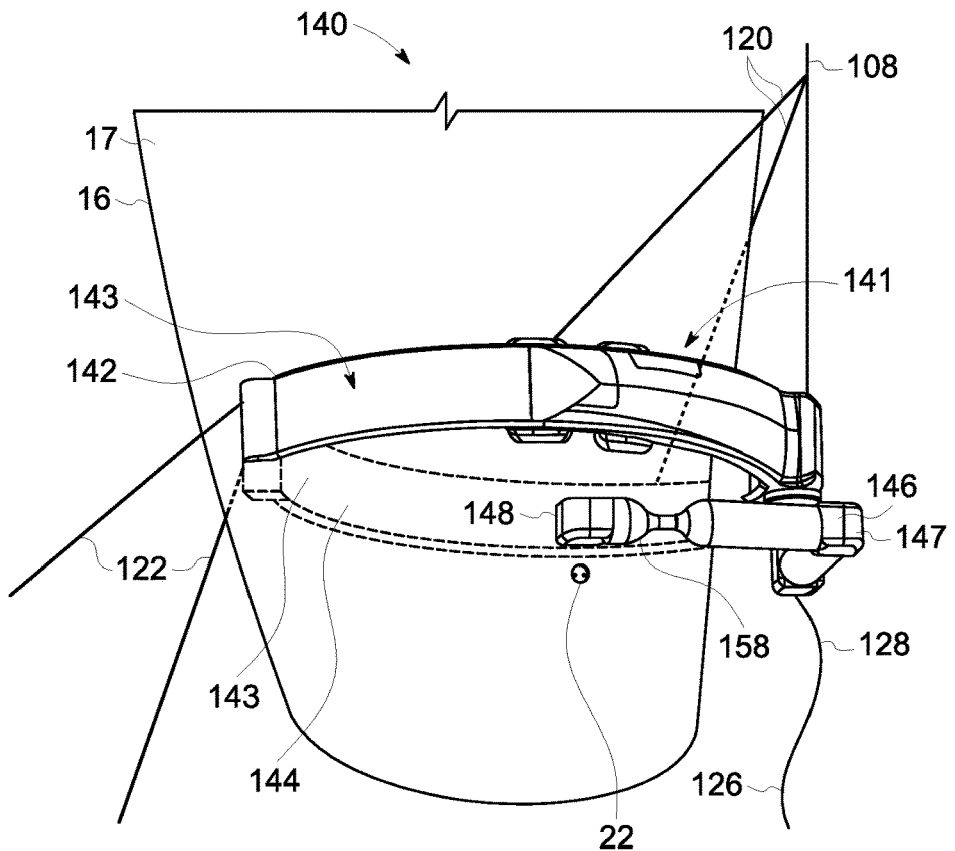
FIG. 7 illustrates a perspective view of another embodiment of a robotic testing device, in accordance with one or more embodiments of the present disclosure.

Referring now to FIGS. 6 and 7, an embodiment of a robotic testing device 140, generally similar to robotic testing device 102 of FIGS. 1-5, is illustrated. It is again noted that repeat use of reference characters throughout the embodiments is intended to represent the same or analogous features or elements. In this particular embodiment, the robotic testing device 140 is configured having generally open geometry shape when attached to the rotor blade 16. More particularly, the robotic testing device 140 is comprised of an attachment mechanism 141. In the illustrated embodiments, the attachment mechanism is comprised of at least two arms, and more particularly a first arm 142 and a second arm 144 (as shown by dotted line). In an alternate embodiment, any number of arms, similar to first and second arms 142, 144 may be implemented. The first and second arms 142, 144 may generally have any suitable dimensions (e.g. height, width, thickness) and/or shape. Additionally, the first and second arms 142, 144 may generally be formed from any suitable material. However, in a particular embodiment of the present subject matter, the first and second arms 142, 144 may be formed from a relatively lightweight material (e.g., aluminum, wood, polymers and/or any other suitable lightweight materials) so as to reduce the overall weight of the system. At least one of the first and second arms 142, 144 is actuable to provide for clamping to an exterior surface 17 of the one or more rotor blades 16, about a perimeter of the rotor blade 16, in combination with the other of the arms 142, 144. More particularly, as illustrated in FIGS. 6 and 7, the first arm 142 is actuatable to provide clamping to an exterior surface 17 of the one or more rotor blades, and the second arm 144 is non-clamping and may optionally include articulation with a resistance (i.e. a spring or piston) to control an over-clamp condition. To provide for clamping, at least one of the first and second arms 142, 144 includes a clamping surface 143 that at least partially engages the exterior surface 17 of the rotor blade 16 when positioned adjacent the electrically conductive lightning receptor 22. In an alternate embodiment, the first and second arms 142, 144 may each be configured as a clamping arm and actuable to provide clamping to an exterior surface 17 of the one or more rotor blades.

In yet another alternate embodiment, the robotic testing device 140 is comprised of at least two arms, and more particularly a first arm 142 and a second arm 144 that in lieu of clamping, are configured to include a cinching rope, suction cups, sticky feet, inflating balloon ring, perching drone, etc. to provide coupling of the at least two arms 142, 144 to the exterior surface 17 of the one or more rotor blades 16. In yet another alternate embodiment, coupling to the to the exterior surface 17 of the one or more rotor blades 16 may include two sets of self-propelled, rotating angle, roller wheels that have no active articulation but spread a taught suspension mechanism when "driven" onto the leading edge of blade 16.

In the embodiment of FIGS. 6 and 7, the robotic testing device 140 further includes a robotic end effector 146, such as an articulating robotic arm 147, coupled to the first and second arms 142, 144.

The robotic end effector 146 is configured for articulation by one or more of the up-tower operator 118 (FIG. 2) and/or the one or more ground operators 124 (FIG. 2) so as to position the LPS test probe 148 in alignment with the electrically conductive lighting receptor 22. In an alternate embodiment, the robotic end effector 146 is configured as a tool, or to hold a tool, that may be necessary to carry out the inspection and/or maintenance to which it is being utilized. The robotic end effector 146 may be articulated by at least one of the one or more ground operators 124 (FIG. 2) via the remote monitoring and control interface device 132. In an embodiment, the robotic end effector 146 is configured to be pivotally attached to the first and second arms 142, 144. In an embodiment, the LPS test probe 148 is coupled to the robotic end effector 146 using one or more mounting devices and/or mounting platforms (not shown). In general, it should be appreciated that the LPS test probe 148 of the present subject may generally have any suitable configuration that permits the LPS test probe 148 to be positioned onto or positioned to otherwise make contact with the electrically conductive lightning receptor 22 of the LPS 20. In the embodiment of FIG. 6, the robotic testing device 102, and more particularly, the first and second arms 142, 144 are positioned to clamp to the rotor blade 16 below the electrically conductive lightning receptor 22, such that the robotic testing device 102 is positioned vertically between the electrically conductive lightning receptor 22 and the support surface 114. In the embodiment of FIG. 7, the robotic testing device 102, and more particularly, the first and second arms 142, 144 are positioned to clamp to the rotor blade 16 above the electrically conductive lightning receptor 22, such that the robotic testing device 102 is positioned vertically between the up-tower anchor point 110 and the electrically conductive lightning receptor 22. Thus, one of ordinary skill in the art should appreciate that various different testing device configurations may be utilized within the scope of the present disclosure.

Figure 8:
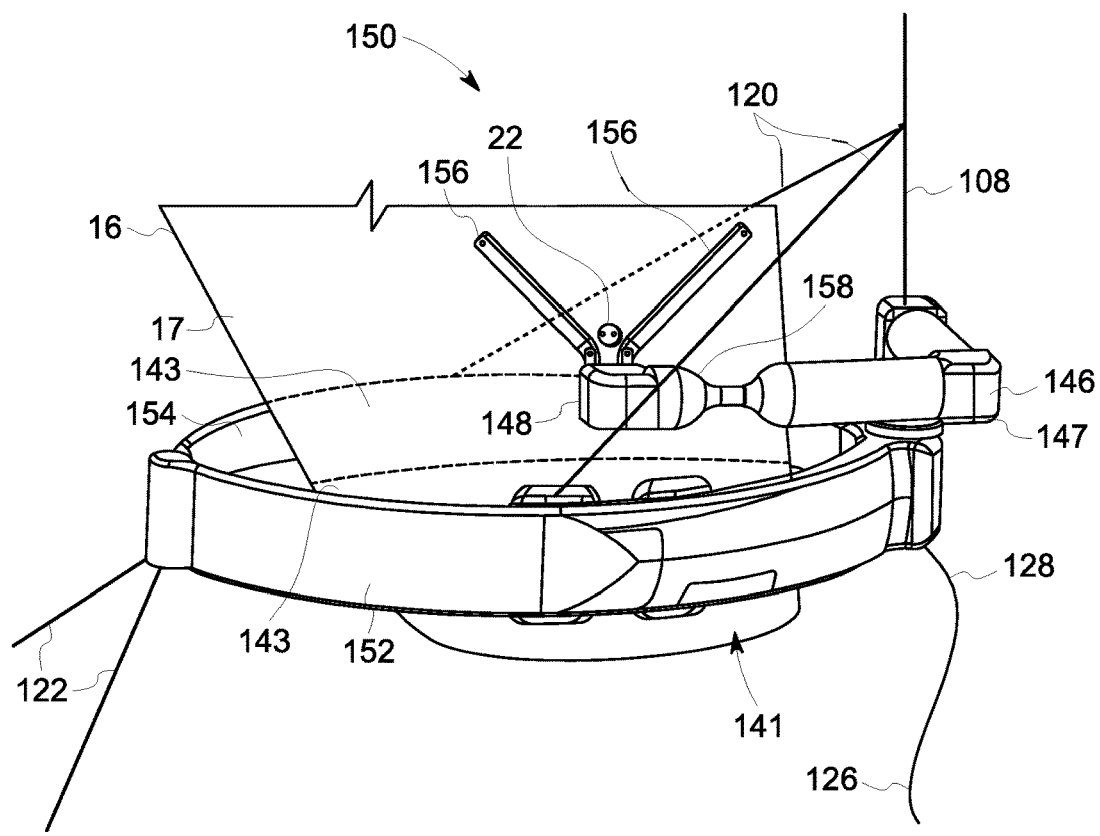
FIG. 8 illustrates a perspective view of another embodiment of a robotic testing device, in accordance with one or more embodiments of the present disclosure.
Figure 9:
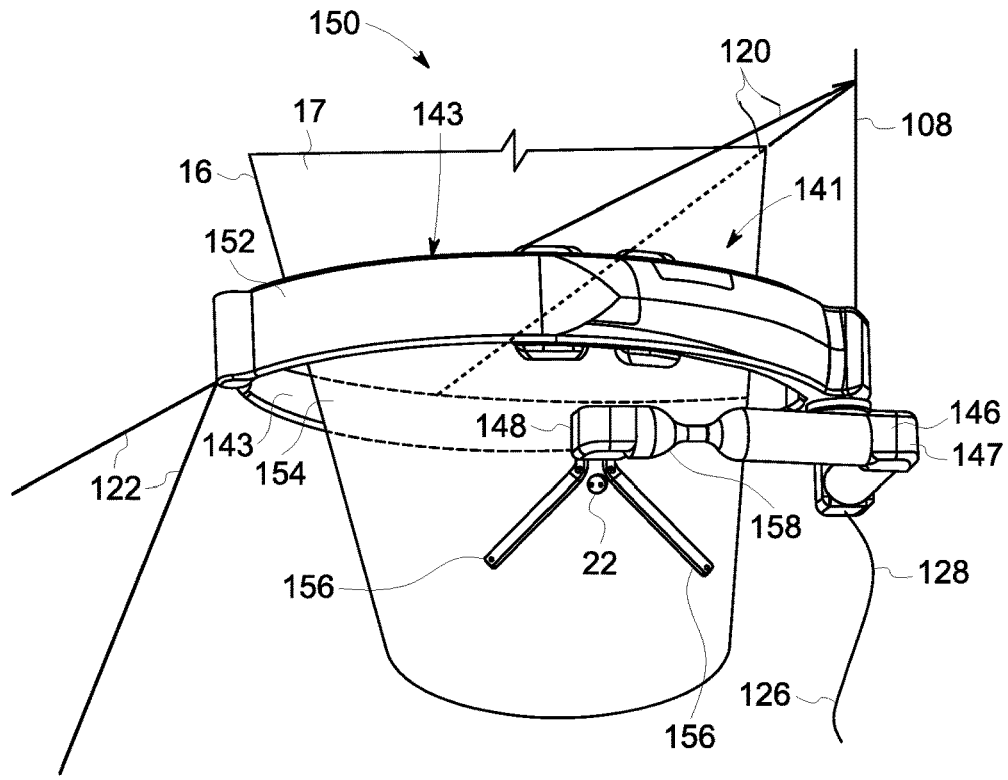
FIG. 9 illustrates a perspective view of another embodiment of a robotic testing device, in accordance with one or more embodiments of the present disclosure.

Referring now to FIGS. 8 and 9, another embodiment of a robotic testing device 150 is illustrated and may be configured having generally closed geometry shape when clamped to the rotor blade 16. In general, the illustrated robotic testing device 150 may include the same or similar components and may be configured similarly to the robotic testing device 140 described above with reference to FIGS. 6 and 7, except for the below noted differences. The robotic testing device 150 may generally be configured to slide onto, fit over or otherwise be positioned around at least a portion of a rotor blade 16 of the wind turbine 10. More particularly, the robotic testing device 150 is comprised of a first arm 152 and a second arm 154. The first and second arms 152, 154 may generally have any suitable dimensions (e.g. height, width, thickness) and/or shape. Additionally, the first and second arms 152, 154 may generally be formed from any suitable lightweight material as previously described, so as to reduce the overall weight of the system. The first and second arms 152, 154 are configured for clamping to the exterior surface 17 of the one or more rotor blades 16 and about a substantial perimeter of the rotor blade 16. In contrast to the embodiment of FIGS. 5 and 6, in this particular embodiment, the first and second arms 152, 154 completely encircle the rotor blade 16 when in a clamped, closed position. To provide for clamping, each of the first and second arms 152, 154 includes a clamping surface 153 that engages with the exterior surface 17 of the rotor blade when positioned adjacent the electrically conductive lightning receptor 22.

Specifically, the robotic testing device 150 may be configured such that, when the first and second arms 152,154 are clamped to the rotor blade 16, a LPS test probe 148 of the robotic testing device 150 is positioned to make electrical contact with the electrically conductive lightning receptor 22 of the LPS 20. Accordingly, it should be appreciated that the shape, size and/or configuration of the first and second arms 152, 154, as well as the relative positioning of the robotic testing device 150 to the rotor blade 16, may generally vary from wind turbine to wind turbine depending on numerous factors including, but not limited to, the shape, size and/or configuration of the rotor blade 16 and the positioning of the electrically conductive lightning receptors 22 on the rotor blade 16.

Similar to the previous embodiment, in the embodiment of FIGS. 8 and 9, the robotic testing device 150 further includes a robotic end effector 146, such as a moveable robotic arm 147, coupled to the first and second arms 152, 154. The robotic end effector 146 is configured for articulation by one or more of the up-tower operator 118 (FIG. 2) and/or the one or more ground operators 124 (FIG. 2) so as to be position a LPS test probe 148 in alignment with the electrically conductive lighting receptor 22. The robotic end effector 146 may be articulated by at least one of the one or more ground operators 124 (FIG. 2) via the remote monitoring and control interface device 132. The robotic end effector 146 is coupled to the first and second arms 152, 154. The robotic end effector 146 having coupled thereto the LPS test probe 148. The LPS test probe 148 is positioned onto or positioned to otherwise make contact with the electrically conductive lightning receptor 22 of the LPS 20. In the embodiment of FIG. 8, the robotic testing device 150, and more particularly, the first and second arms 152, 154 are positioned to clamp about the rotor blade 16 below the lightning receptor 22, such that the robotic testing device 150 is positioned vertically between the electrically conductive lightning receptor 22 and the support surface 114. In the embodiment of FIG. 8, the robotic testing device 150, and more particularly, the first and second arms 152, 154 are positioned to clamp to the rotor blade 16 above the lightning receptor 22, such that the robotic testing device 102 is positioned vertically between the up-tower anchor point 110 and the lightning receptor 22. In addition, in the embodiment of FIGS. 8 and 9, the robotic testing device 150 includes a probe alignment feature 156 to provide alignment and guidance of the LPS test probe 148 in a manner to effect contact with the electrically conductive lightning receptor 22 of the LPS 20. In this particular embodiment, in the presence of an electrically conductive lightning receptor 22 that is elevated above the exterior surface 17 of the rotor blade 16, the probe alignment feature 156 is slidably guided along the electrically conductive lightning receptor 22 to align the LPS test probe 148 with the lightning receptor 22. In an alternate embodiment, the robotic test device 150 does not include a probe alignment feature.

Figure 10:
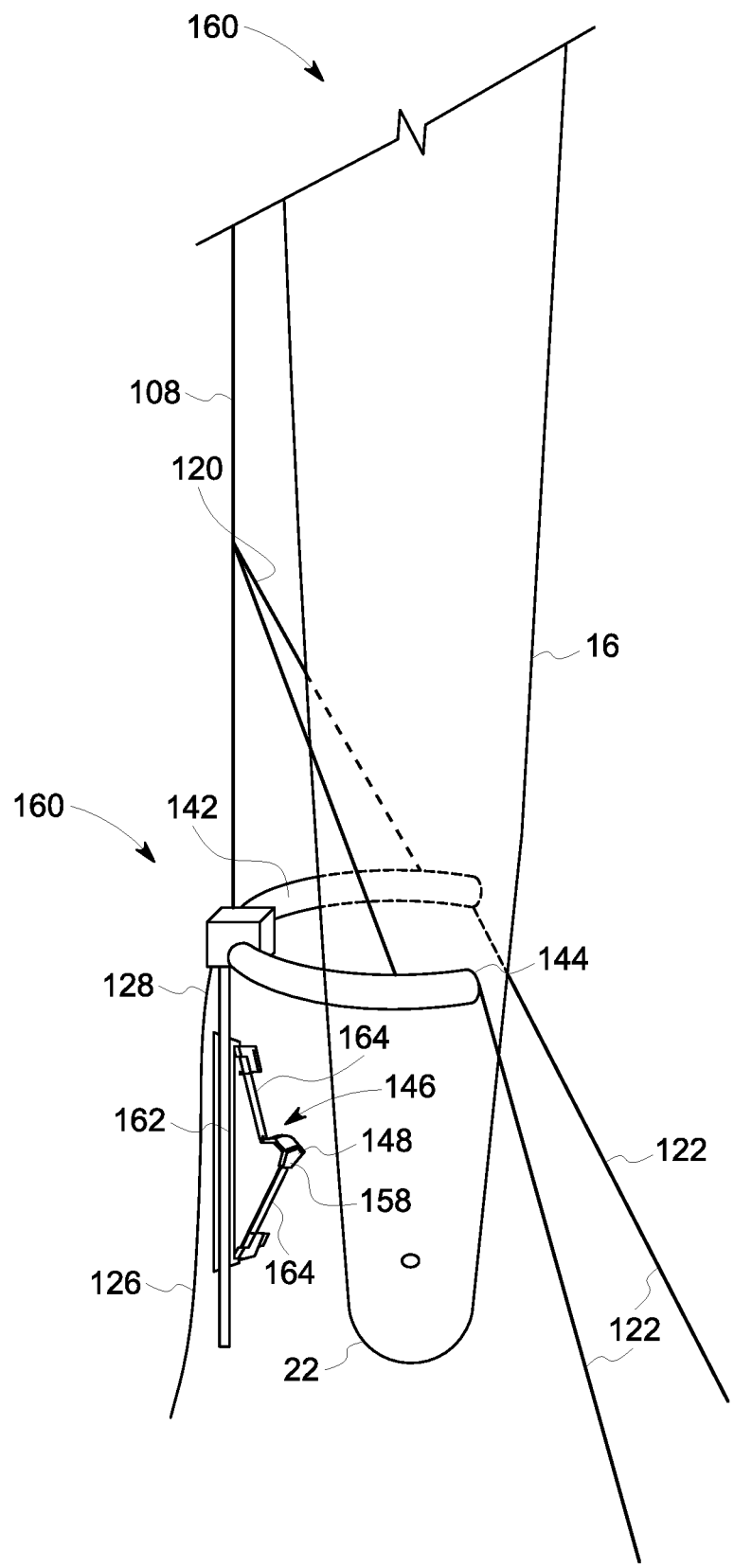
FIG. 10 illustrates a perspective view of an embodiment of a robotic testing device including an end effector in a retracted position, in accordance with one or more embodiments of the present disclosure.
Figure 11:
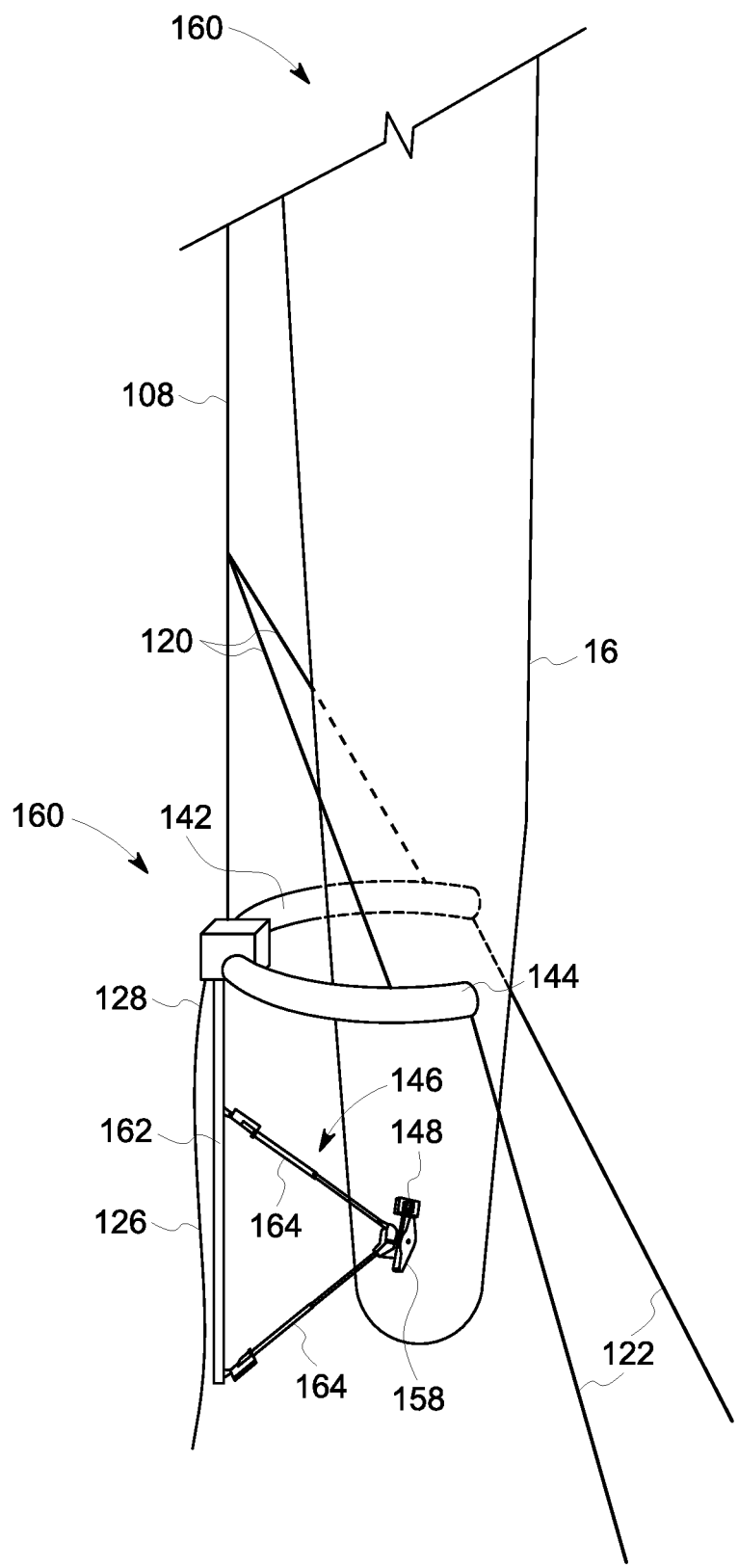
FIG. 11 illustrates a perspective view of the robotic testing device of FIG. 10 including the end effector in an extended position, in accordance with one or more embodiments of the present disclosure.

Referring now to FIGS. 10 and 11, illustrated is a perspective view of another embodiment of a robotic testing device 160 for performing one or more inspection test on the LPS 20 of a wind turbine 10. As shown in the illustrated embodiment, the robotic testing device 160 generally includes a first arm 142 and a second arm 144, such as previously described with regard to FIGS. 6 and 7. In this particular embodiment, in lieu of a robotic arm 147 as the robotic end effector 146 as in the embodiments of FIGS. 6-9, included is a robotic end effector 146 including a support rail 162 and two or more cooperatively engaged extendable end effector arms 164. The support rail 162 may generally comprise any suitable structural member configured to support the two or more cooperatively engaged extendable end effector arms 164 and the LPS test probe 148. Illustrated in FIG. 10 are the two or more cooperatively engaged extendable end effector arms 164 in a retracted position. Illustrated in FIG. 11 are the two or more cooperatively engaged extendable end effector arms 164 in extended position so as to position the LPS test probe 148 in contact with the lightning receptor 22. As illustrated the two or more cooperatively engaged extendable end effector arms 164, and thus the LPS test probe 148, are moveable vertically along the support rail 162 as the robotic testing device 102 is positioned relative to the lightning receptor 22. Thus, the support rail 162 may generally include a first end 166 configured to be coupled to the first arm 142 and the second arm 144, and extending therefrom using any suitable mechanical fasteners, such as bolts, screws, clips, tape, glue, adhesives, brackets and the like and/or using any suitable attachment method (e.g., bonding, welding and the like). However, in a particular embodiment of the present subject matter, the first end 166 of the support rail 162 may be configured to be pivotally coupled to the first and second arms 142, 144 using any means that permits the support rail 162 to pivot or otherwise move about its attachment point. For example, the support rail 162 may be coupled to the first and second arms 142, 144 using a ball and socket, by loosely attaching the support rail 162 onto a pin or bolt extending through the support rail 162 or using any other suitable pivotal attachment mechanism and/or method.

It should be appreciated that, in alternative embodiments of the present subject matter, the support rail 162 and the first and second arms 142, 144 need not be formed as separate components. For instance, in one embodiment, the support rail 162 and the first and second arms 142, 144 may be formed integrally as a single component using any suitable manufacturing process, such as any suitable molding and/or casting process.

Figure 12:
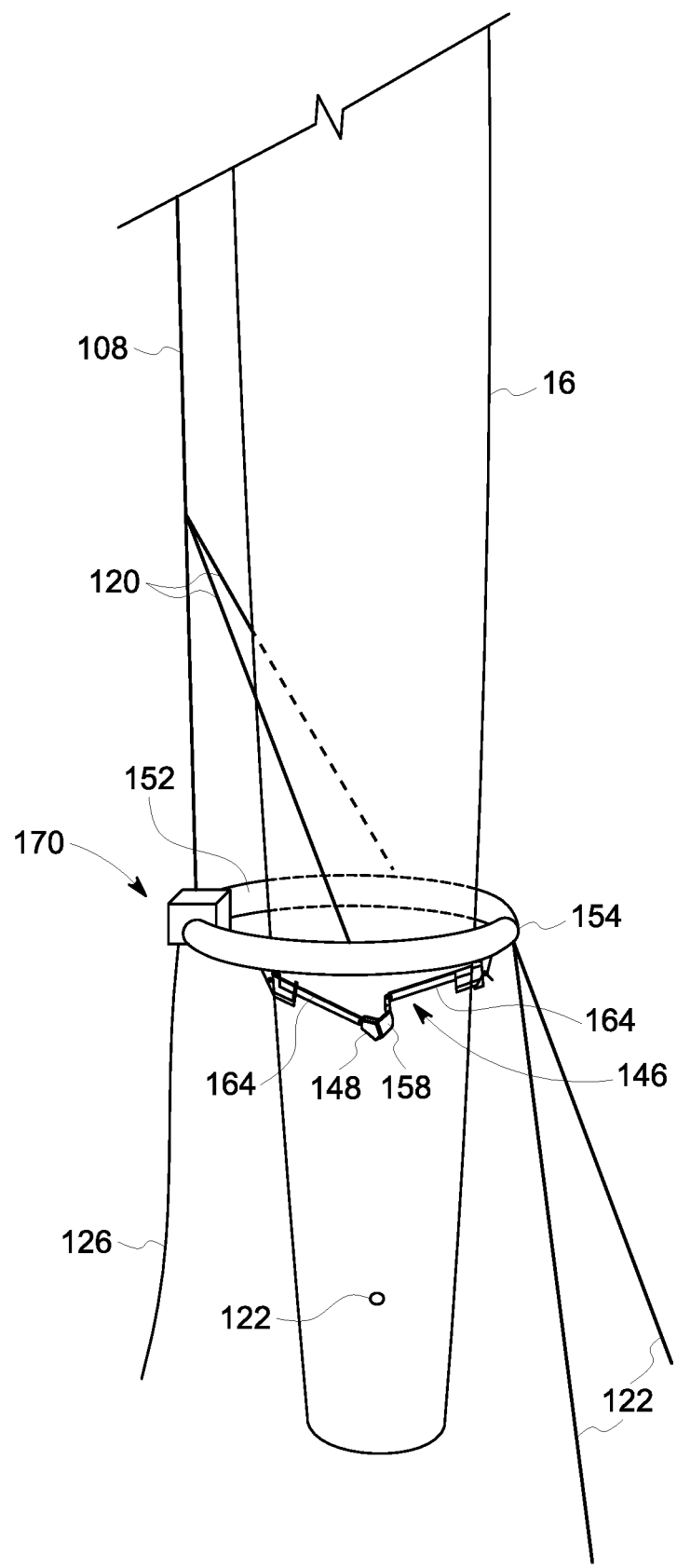
FIG. 12 illustrates a perspective view of another embodiment of a robotic testing device including an end effector in a retracted position, in accordance with one or more embodiments of the present disclosure.
Figure 13:
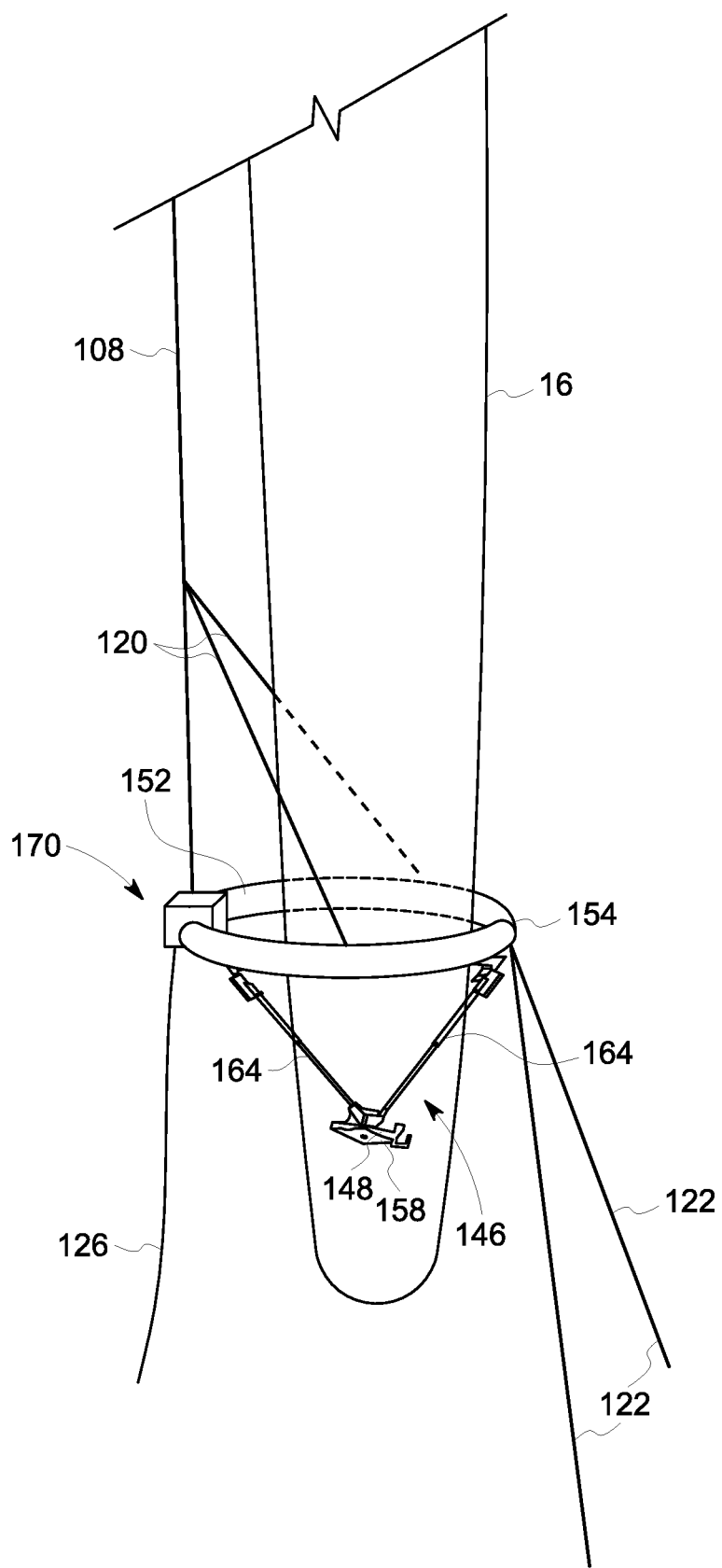
FIG. 13 illustrates a perspective view of the robotic testing device of FIG. 12 including the end effector in an extended position, in accordance with one or more embodiments of the present disclosure.
Figure 14:
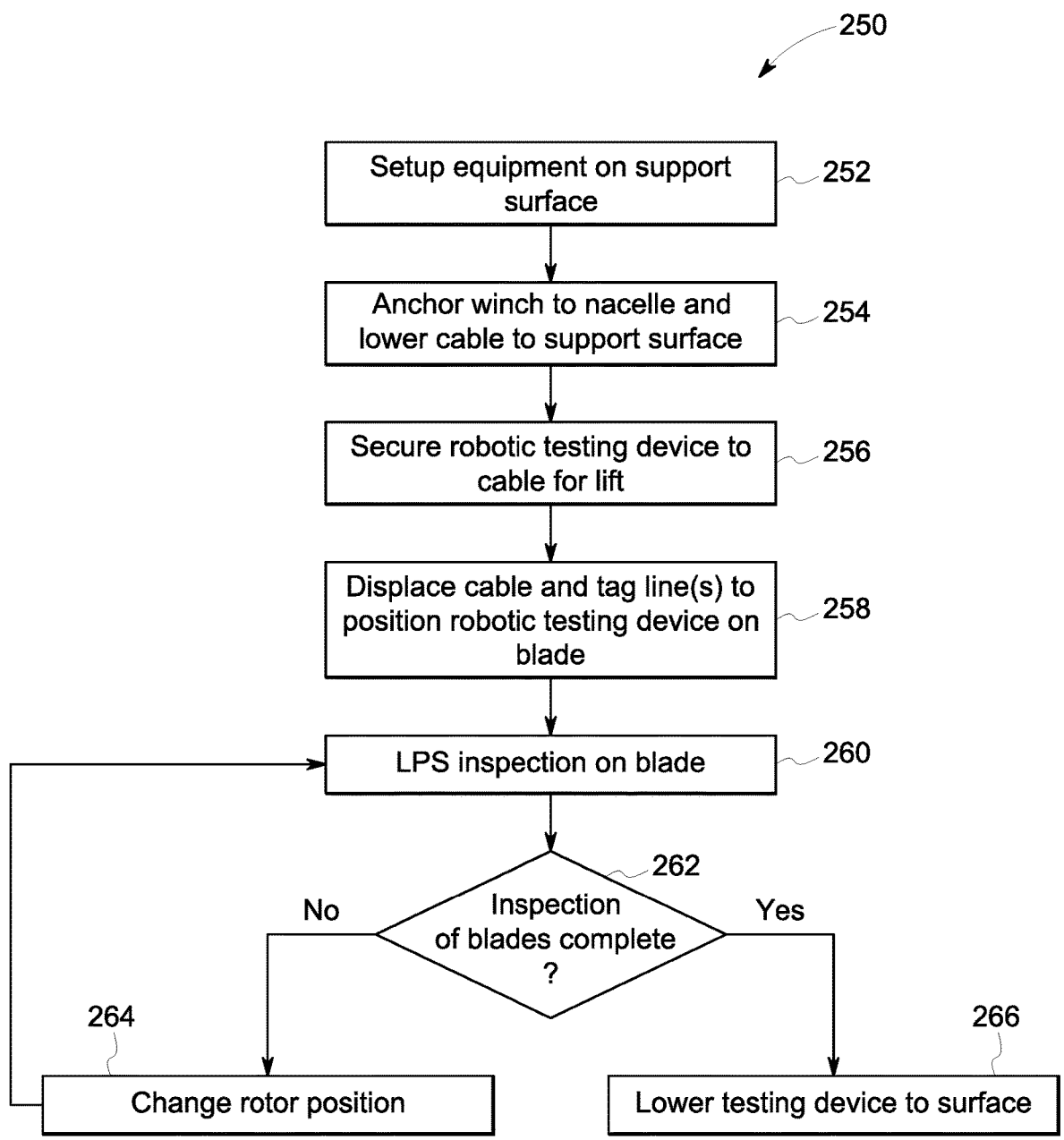
FIG. 14 illustrates an overview of a method for performing LPS testing, in accordance with one or more embodiments of the present disclosure.
Figure 15:
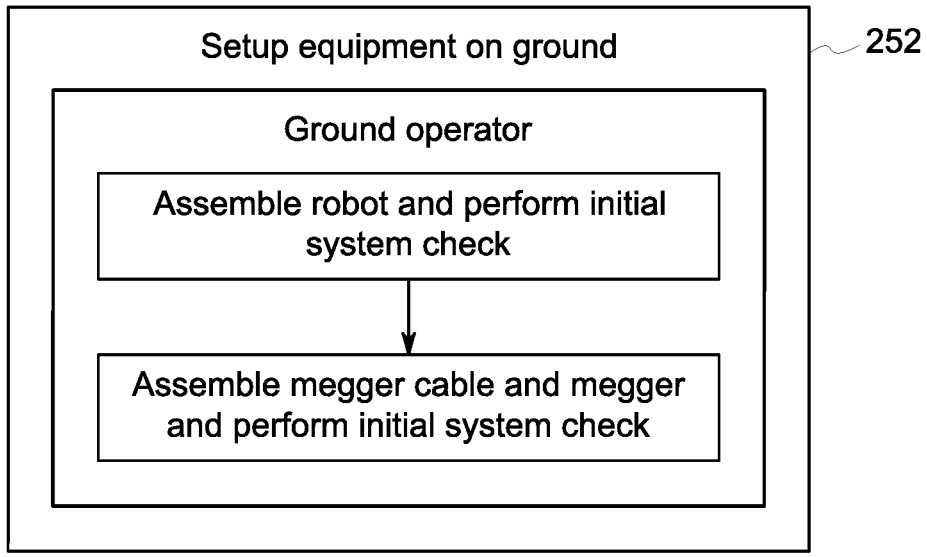
FIG. 15 illustrates a detailed step in the method for performing LPS testing of FIG. 14, in accordance with one or more embodiments of the present disclosure.

Referring now to FIGS. 12 and 13, illustrated is a perspective view of another embodiment of a robotic testing device 170 for performing one or more inspection test on the LPS 20 of a wind turbine 10. In general, the illustrated robotic testing device 160 may include the same or similar components and may be configured similarly to the robotic testing device 160 described above with reference to FIGS. 10 and 11 except for the below noted differences. As shown in the illustrated embodiment, the robotic testing device 170 generally includes a first arm 152 and a second arm 154, such as previously described with regard to FIGS. 8 and 9. Similar to the embodiment of FIGS. 10 and 11, in this particular embodiment, in lieu of a robotic arm 147 as the robotic end effector 146, included is a robotic end effector 146 including two or more cooperatively engaged extendable end effector arms 164. The two or more cooperatively engaged extendable end effector arms 164 may generally comprise any suitable structural member configured to support the LPS test probe 148. Illustrated in FIGS. 12 and 13 are the two or more cooperatively engaged extendable end effector arms 164 coupled to the first and second arm 152, 154. In an alternate embodiment, a support rail similar to that previously disclosed in FIGS. 9 and 10 may be included and support the two or more cooperatively engaged extendable end effector arms 164 and the LPS test probe 148 in a similar configuration. Illustrated in FIG. 12 are the two or more cooperatively engaged extendable end effector arms 164 in a retracted position and coupled thereto the first arm 152. Illustrated in FIG. 13 are the two or more cooperatively engaged extendable end effector arms 164 in extended position, and coupled thereto the first arm 152, so as to position the LPS test probe 148 in contact with the lightning receptor 22.

In several other embodiments of the present subject matter, as previously described, the robotic testing device 140, 160 may have a generally non-closed or open shape when clamped to the blade 16. For example, the robotic testing device 140, 160 may be semi-circular shaped, "C" shaped or have any other suitable open shaped configuration. when in a clamped state so as to be configured to be positioned in a clamping configuration to a portion of the exterior surface 17 of the rotor blade 16. In particular, the robotic testing device 140, 160, and more particularly the first and second arms 142, 144 may be operable such that the tip 24 of the rotor blade 16 must be at least partially aligned within the robotic testing device 140, 160 in order to permit the LPS test probe 148 to be positioned onto the rotor blade 16 as the robotic testing device 140, 160 is clamped about the rotor blade 16 using the disclosed system 100.

In several other embodiments of the present subject matter, as previously described, the robotic testing device 150, 170 may have a closed shape when in a clamped state about the rotor blade 16 (i.e., a shape that can be traced using the same starting and stopping points) so as to be configured to be positioned around the outer perimeter of the rotor blade 16. In particular, the robotic testing device 150, 170 may be configured such that the tip 24 of the rotor blade 16 must extend through closed shaped of the robotic testing device 150, 170 in order to permit the LPS test probe 148 to be positioned onto the rotor blade 16 as the robotic testing device 150, 170 is raised using the disclosed system 100.

Thus, as shown in FIGS. 6-13, the robotic testing device 140, 150, 160, 170 may have a substantially elliptical shape when in a clamped state, generally corresponding to the shape of the rotor blade 16 in the area adjacent to the blade tip 24. In other embodiments, the robotic testing device 140, 150, 160, 170 may generally have any other suitable shape configuration, such as by having a circular, rectangular or triangular shape. As such, the robotic testing device 140, 150, 160, 170 may be positioned onto or around the portion of the outer perimeter of the rotor blade 16 at which the electrically conductive lightning receptor 22 is disposed. In alternate embodiments, each of the first and second arms 142, 144, 152, 154 may further include a clamping means (e.g. adjustable clamping pads disposed about an interior surface of the arm, or the like) for clamping the first and second arms 142, 144, 152, 154 to the outer surface 17 of the rotor blade 16 along at least partial length of the first and second arms 142, 144, 152, 154, or otherwise provide for the inner surface of each of the plurality of arms 142, 144, 152, 154 to engage the outer surface 17 of the rotor blade 16.

Additionally, in several embodiments of the present subject matter, the width and/or other dimensions of the arms 142, 144, 152, 154 may be chosen such that the robotic testing device 140, 150, 160, 170 may only be positioned around the rotor blade 16 up to the location of the lightning receptor 22. For example, in one embodiment, the dimensions of the arms 142, 144, 152, 154 may be configured such that an inner surface of each of the arms 142, 144, 152, 154 fully engages the outer perimeter of the rotor blade 16 as the robotic testing device 140, 150, 160, 170 is positioned adjacent the rotor blade 16, and in particular the electrically conductive lightning receptor 22, thereby preventing the arms 142, 144, 152, 154 from being raised further along the blade 16. Moreover, in several embodiments, the dimensions and/or shape of the arms 142, 144, 152, 154 may be fixed or may be adjustable. Thus, in one embodiment, the arms 142, 144, 152, 154 may be configured such that the dimensions of the robotic testing device 140, 150, 160, 170 may be increased or decreased so as to generally correspond to the size, shape and/or configuration of the rotor blade 16 at the location of the lightning receptor 22. For example, the arms 142, 144, 152, 154 of the robotic testing device 140, 150, 160, 170 may be telescoping or may include other suitable adjustment features to permit the positioning of the robotic testing device 140, 150, 160, 170 along the blade 16. In another embodiment, the arms 142, 144, 152, 154 may be formed from a flexible and/or expandable material such that the shape and/or size of the robotic testing device 140, 150, 160, 170 may be adapted to the shape and/or size of the rotor blade 16 as it is raised and clamped about the rotor blade 16.

The LPS test probe 148 of the robotic testing device 140, 150, 160, 170 may generally comprise any suitable test probe that is capable of forming an electrical connection or otherwise making electrical contact with the electrically conductive lightning receptor 22 of the LPS 20. Thus, in several embodiments, the LPS test probe 148 may comprise any suitable test probe, such as a Megger® test probe, configured for coupling to the remote monitoring and control interface device 132, such as a device including a multimeter, clamp meter, insulation tester, multifunction tester and/or continuity tester. The LPS test probe 148 is positioned such that it may contact the electrically conductive lightning receptor 22 as the robotic testing device 140, 150, 160, 170 is positioned adjacent the rotor blade 16. In an alternate embodiment, a signal, voltage or resistance measurement is supplied from the robotic testing device 140, 150, 160, 170 and detected elsewhere on the tower 12 via a partnering device, which is coupled via wired or wirelessly, to the robotic testing device 140, 150, 160, 170. For example, in an embodiment a pulse is sent down the conductor line 26 from the robotic testing device 140, 150, 160, 170, and a partnering device is located at the nacelle hub bearing to detect said pulse.

In a particular embodiment of the present subject matter, the robotic testing device 140, 150, 160, 170 may also include at least one camera 158, such as an omnidirectional camera system, mounted to one or more of a portion of the robotic testing device 140, 150, 160, 170, proximate the end effector 146, proximate the tip 24 to aid in positioning of the robotic testing device 140, 150, 160, 170 or determine positioning at a proper height. The at least one camera 158 is coupled to the remote monitoring and control interface device 132. In such an embodiment, the camera 158 captures images of one or more surfaces of interest from multiple perspectives during positioning of the robotic testing device 140, 150, 160, 170 adjacent the rotor blade 16 and/or positioning of the LPS test probe 148 relative to the electrically conductive lightning receptor 22. The captured images allow for the recreation of 3D models or "streetview" style reconstructions of positioning for operators, inspectors and automated algorithms to interrogate in real-time or later offline. Optimized lighting in the form of an ability to turn one or more lights (not shown) OFF/ON may be included for image capture and navigation purposes. The camera 158 is configured for use by at least one of the one or more ground operators 124 to view areas of interest or can be used for automated positioning recognition systems to detect positioning autonomously.

Additionally, in a particular embodiment of the present subject matter, the robotic testing device 140, 150, 160, 170 may also include a voltage source (not shown), such as a battery or other power source, mounted to a portion of the robotic testing device 140, 150, 160, 170 and electrically coupled to the LPS test probe 148. In such an embodiment, the voltage source may be configured to transmit an electrical current through the LPS test probe 148 to the electrically conductive lightning receptor 22 when the LPS test probe 148 is placed in contact with the receptor 22. As such, the continuity of the LPS 20 may be tested by measuring an electrical property of the system, such as by measuring the resistance in the lightning conductor 26 adjacent to the support surface 114 or at the user interface and more particularly the remote monitoring and control interface device 132.

One of ordinary skill in the art should appreciate that the up-tower anchor point 110 of the system 100 disclosed herein may generally be established by having a service/maintenance worker, and more particularly, the up-tower operator 118 climb up the wind turbine 10 and attach or otherwise couple the cable 108 to the wind turbine 10. For example, in the illustrated embodiments, the up-tower operator 118 may climb onto the nacelle 14 of the wind turbine 10 and attach the winch 116 to a portion of the nacelle 14. After the LPS test has been performed on the LPS 20 of the wind turbine 10, it may be desirable to detach or otherwise remove the presently disclosed system 100 from the wind turbine 10 so that it may be transported to another wind turbine. Thus, in one embodiment, the up-tower operator 118 may climb back up the wind turbine 10 and detach or otherwise remove the cable 108 and/or the winch 116 from the wind turbine 10.

Alternatively, the disclosed system 100 may be configured so as to remove the necessity for a second trip back up the wind turbine 10. For example, the winch 116 or similar device (not shown) may be secured to the wind turbine 10 at the up-tower anchor point 110 and may be configured to automatically raise and lower the cable 108 wrapped around its spindle. As such, when a test of the LPS 20 is desired to be performed on the wind turbine 10, the winch 116 may be configured to lower the cable 108 to the support surface 114. The robotic testing device 140, 150, 160, 170 may then be secured to the cable 108 and raised by the winch 116 as the up-tower anchor point 110. Once the test has been completed, the winch 116 may again unwind the cable 108, lowering it to the support surface 114, to permit the robotic testing device 140, 150, 160, 170 to be detached from the cable 108, and the cable 108 then returned up-tower for storage about the spindle of the winch 116.

It should also be appreciated that, as used herein, the terms "cable" and "line" refer to any length of material which may be configured to function as described herein. As such, the cables 108, the one or more additional cables 120, and the one or more tag lines 122 of the present subject matter may include any suitable cables, wires, ropes, chains or lines formed from any suitable material. For example, in one embodiment, any of the cables 108, the one or more additional cables 120, and the one or more tag lines 122 may comprise rope formed from twisted, braided or woven natural fibers (e.g., hemp and cotton) or synthetic fibers (e.g., polypropylene, nylon and polyesters). In other embodiments, any of the one or more additional cables 120, and the one or more tag lines 122 may comprise coated or non-coated, flexible or non-flexible metal cables and/or chains.

Referring now to FIGS. 14-21, schematically show an exemplary method 250 of performing one or more test on a LPS 20 of a wind turbine 10, according to the present disclosure. Method 250 includes an initial setup of equipment on the ground, in a step 252. More specifically, as detailed in FIG. 14, step 252 may include steps performed by the one or more ground operators 124, such assembly of the robotic testing device 140, 150, 160, 170 and performing any initial system checks. Step 252 may further include assembly of the LPS test probe 148, such as a Megger® probe and extension lead 126, and performing initial system checks.

Figure 16:
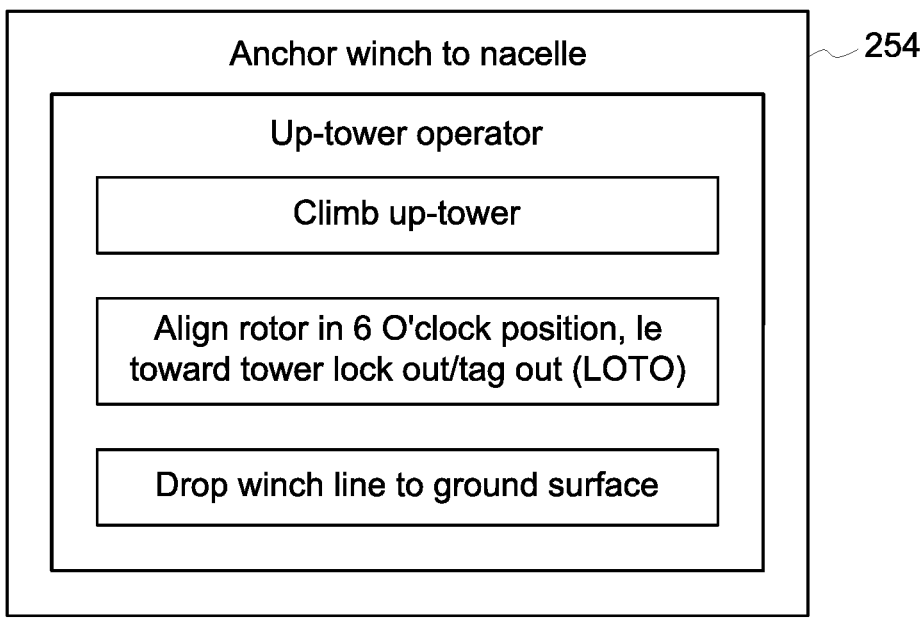
FIG. 16 illustrates a detailed step in the method for performing LPS testing of FIG. 14, in accordance with one or more embodiments of the present disclosure.

In a step 254, up-tower preparedness takes place, such as illustrated in FIG. 16, and may include the up-tower operator 118 ascending the wind turbine, and aligning the rotor blade 16 to be tested in a 6 o'clock position with the leading edge toward the tower 12. In an alternate embodiment, as illustrated in FIG. 3, the rotor blade 16 to be tested may be positioned in an 8 o'clock position with the leading edge away the tower 12. If not present, the up-tower operator 118 attaches the winch 116 to the nacelle 14, or other anchoring point and lowers the cable 108 to the ground surface 114.

Figure 17:
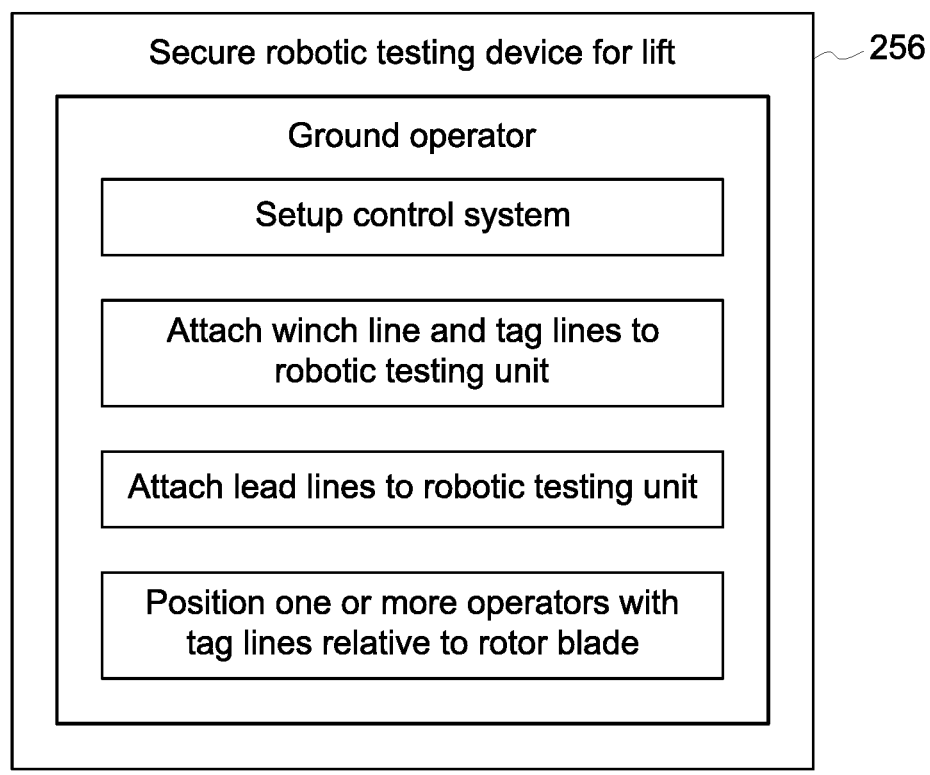
FIG. 17 illustrates a detailed step in the method for performing LPS testing of FIG. 14, in accordance with one or more embodiments of the present disclosure.

The robotic testing device 140, 150, 160, 170 is next coupled to the cable 108 upon reaching the support surface 114 by the one or more ground operator 124, in a step 256. During securement of the robotic testing device 140, 150, 160, 170 to the cable 108, the ground operator 124, as illustrated in FIG. 17, may further setup the control system, attach the one or more tag lines 122 to the robotic testing device 140, 150, 160, 170, attach one or more additional cables 120 to the robotic testing device 140, 150, 160, 170. The one or more ground operators 124, holding the one or more tag lines 122, are next positioned relative to the rotor blade 16 to be tested.

Figure 18:
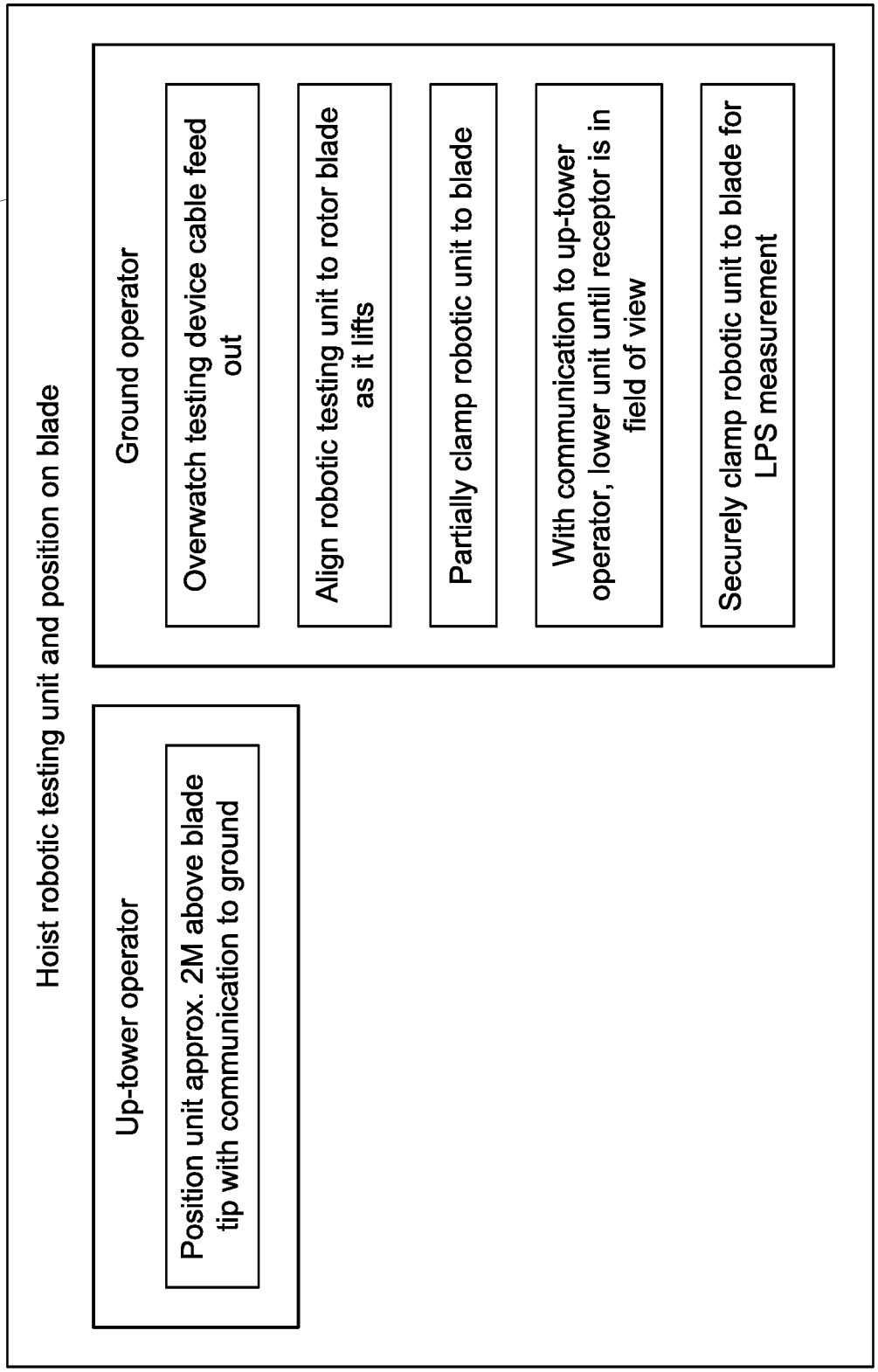
FIG. 18 illustrates a detailed step in the method for performing LPS testing of FIG. 14, in accordance with one or more embodiments of the present disclosure.

Subsequent to securing the robotic testing device 140, 150, 160, 170 to the cable 108, the cable 108 and tag lines 122 are displaced in a manner to raise and position the robotic testing device 140, 150, 160, 170 adjacent the rotor blade 16 to be tested, in a step 258. As illustrated in FIG. 18, step 258 may include the up-tower operator 118 operating the winch 116, and while communicating with the ground operator 124, to positioning the robotic testing device 140, 150, 160, 170 approximately 2M above the blade tip 24 of the rotor blade 16 being tested. While the robotic testing device 140, 150, 160, 170 is being positioned, the one or more ground operators 124 overwatch the extension lead 126 feed out, align the robotic testing device 140, 150, 160, 170 to the rotor blade 16 to be tested, partially clamp the robotic testing device 140, 150, 160, 170 to the blade 16 using operator controls built into the remote monitoring and control interface device 132, position the robotic testing device 140, 150, 160, 170 until the electrically conductive lightning receptor 22 is in field of view, and securely clamp the robotic testing device 140, 150, 160, 170 to the blade 16 for lighting protection system testing.

Figure 19:
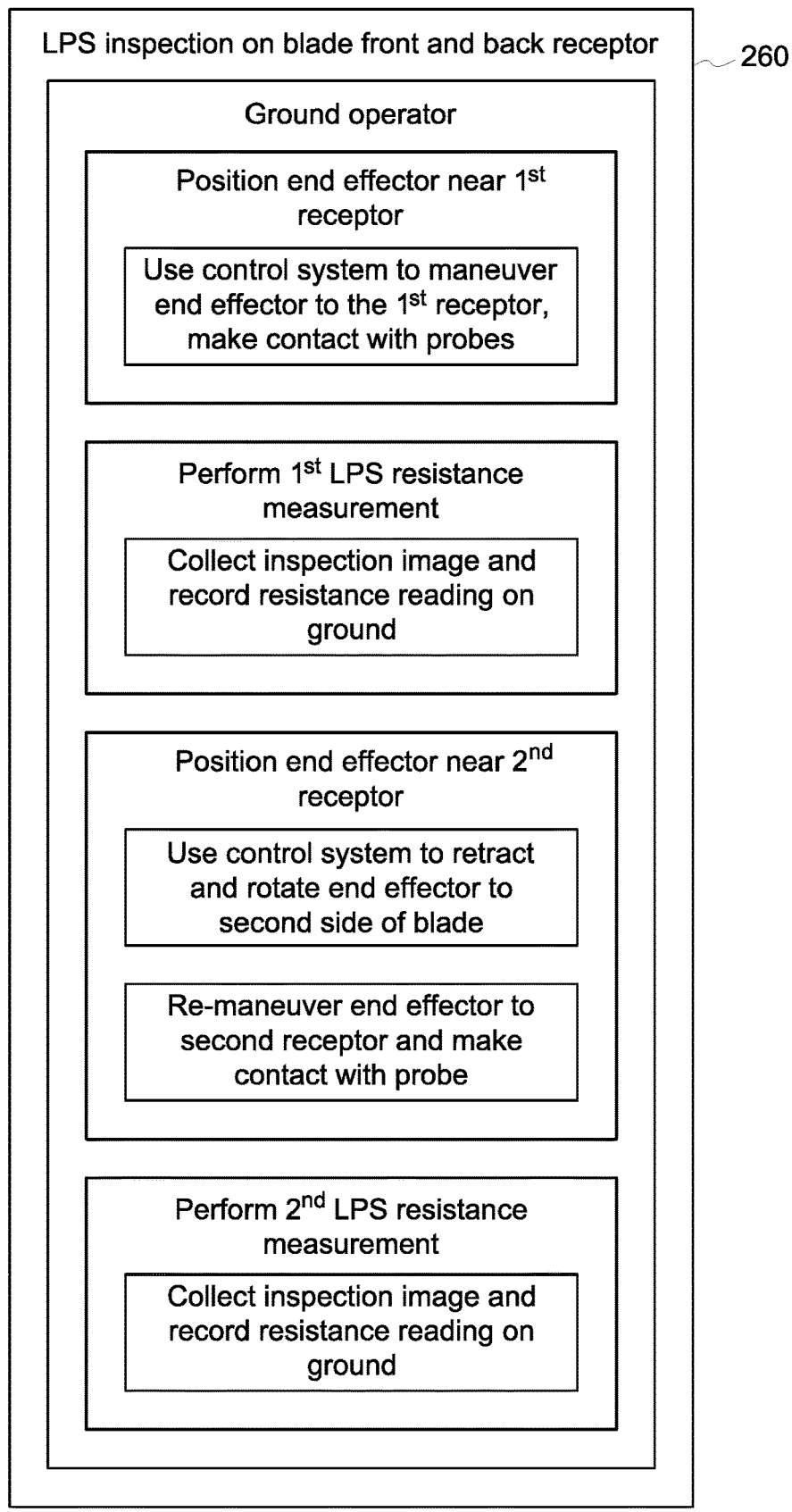
FIG. 19 illustrates a detailed step in the method for performing LPS testing of FIG. 13, in accordance with one or more embodiments of the present disclosure.

After the robotic testing device 140, 150, 160, 170, and more specifically the LPS test probe 148, is in place relative to a lightning receptor 22, the LPS test may be performed on the rotor blade 16, in a step 260. As illustrated in FIG. 19, step 260 may include the ground operator 124, utilizing the operator controls of the remote monitoring and control interface device 132, positioning the robotic end effector 146 to provide contact between the LPS test probe 148 and the electrically conductive lightning receptor 22. The test is next performed with an inspection image optional collected by the camera 158 and test data recorded by the ground operator 124. Subsequent to obtaining data from the first electrically conductive lightning receptor 22 test, the robotic end effector 146 is caused to be retracted and/or moved by the ground operator 124 to position the LPS test probe 148 near an additional electrically conductive lightning receptor 22 to be tested (e.g. such as on an opposed side of the blade 16). The robotic end effector 146 is further maneuvered to provide contact between the LPS test probe 148 and the additional lightning receptor 22. The test is next performed with the inspection image optionally collected by the camera 158 and test data recorded by the ground operator 124.

Figure 20:
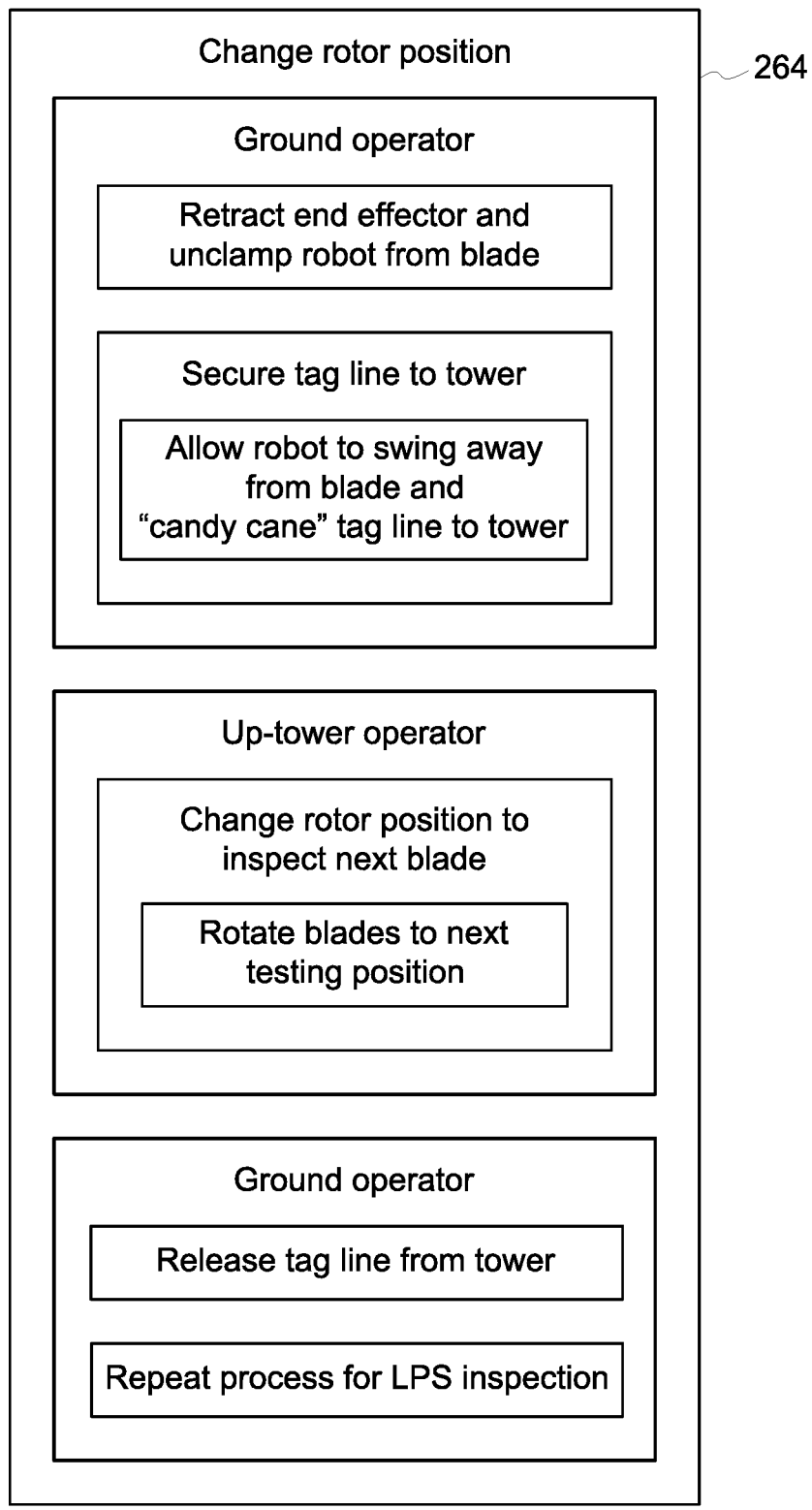
FIG. 20 illustrates a detailed step in the method for performing LPS testing of FIG. 14, in accordance with one or more embodiments of the present disclosure.

After testing relative to the electrically conductive lightning receptor 22 of the rotor blade 16 is complete and it is determined further testing is required on additional blades, in a step 262, the rotor position is changed, in a step 264, to provide testing to take place on additional blades, as illustrated in FIG. 20. To accomplish such, the ground operator 124 may cause the robotic end effector 146 to be retracted and the robotic testing device 140, 150, 160, 170 to be unclamped from the blade 16 that was previously tested. The ground operator 124 further allows the robotic testing device 140, 150, 160, 170 to swing away from the rotor blade 16 and "candy canes" the one or more tag lines 122 to the tower 12.

After the robotic testing device 140, 150, 160, 170 is positioned apart from the previously tested rotor blade 16, the up-tower operator 118 repositions the rotor to position the next rotor blade 16 to be tested in a 6 o'clock position. Thereafter, the ground-operator 124 releases the one or more tag lines 122 from the tower and aids with positioning of the robotic testing device 140, 150, 160, 170 near the rotor blade 16 and the electrically conductive lightning receptor 22 being tested, as previously described. The ground-operator 124 conducts testing on the LPS 20 as previously described, in step 210.

Figure 21:
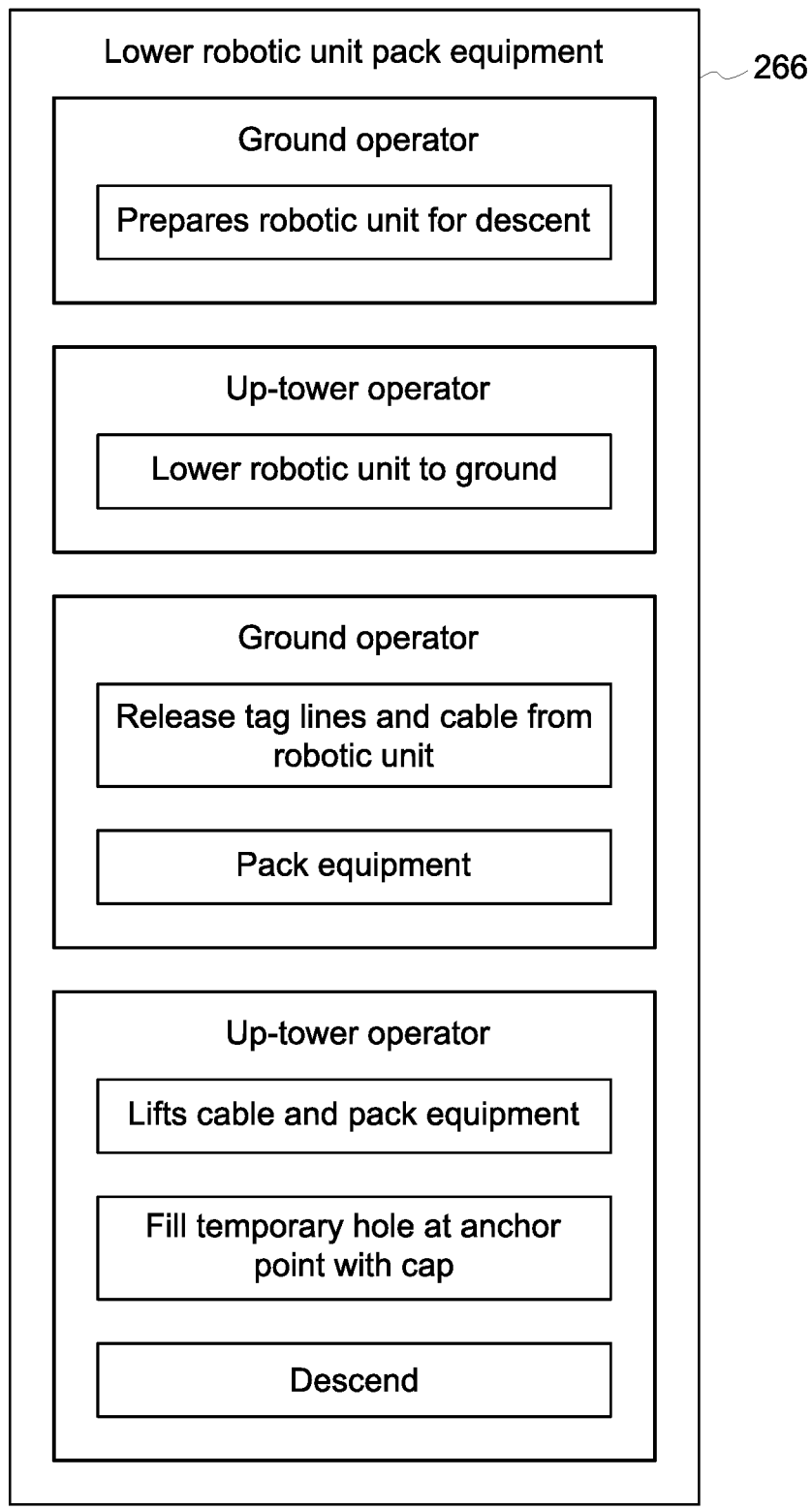
FIG. 21 illustrates a detailed step in the method for performing LPS testing of FIG. 14, in accordance with one or more embodiments of the present disclosure.

The process of repositioning to the next blade 16 to be tested and performing the test is repeated as described. Upon determining all test of the lighting protection system 20 of the wind turbine 10 have been completed, in a step 262, the robotic testing device 140, 150, 160, 170 is lowered to the support surface 114 and the equipment packed, in a step 266. As illustrated in FIG. 21, to accomplish such, the ground operator 124 prepares the robotic testing device 140, 150, 160, 170 for lowering, such as by releasing the arms 142, 144, 152, 154 causing the robotic testing device 140, 150, 160, 170 to swing away from the rotor blade 16. The up-tower operator 118 lowers the robotic testing device 140, 150, 160, 170, such as via the winch 116, to the ground 114. Upon reaching the ground, the ground operator 124 releases the one or more tag lines 122 and cable 108 from the robotic testing device 140, 150, 160, 170 and packs the equipment for transport. The up-tower operator 118 is then able to raise the cable 108 up-tower, such as by winching, and pack the equipment. If present, the up-tower operator 118 may additionally remove the winch 116 and fill any temporary opening(s) formed in the wind turbine 10 structure, such as the nacelle 14. The up-tower operator 118 descends the wind turbine 10 upon completion.

Accordingly, disclosed is system that assists field personnel in performing inspection tests of the LPS on a wind turbine blade without using conventional methods such as a rope crew, or heavy access equipment such as platform, baskets or boom trucks. The disclosed system removes the need for human intervention to perform the LPS inspection tests on the blade and eliminates specialized equipment required for such inspections. A unique aspect of the disclosed system enables the LPS inspection tests to be bundled with annual existing service maintenance crews. A ground operator is used to guide a remotely located robotic testing device, thereby eliminating the need for positioning field personnel on the blades with rope crews or at height using boom trucks or other access platforms. The system allows LPS inspection tests of difficult to access blades to be performed remotely from ground. Previously obtained test data may be used to provide a digital pedigree of inspections. The disclosed innovative approach reduces time, equipment and labor costs associated with conventional LPS test measurement methods.

While the disclosure has been described with reference to one or more embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. This written description uses examples to disclose the invention, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for performing one or more tasks on a lightning protection system (LPS) of a wind turbine, the system comprising:
    a cable having a first end attached to an up-tower anchor point, the cable extending toward a tower support surface such that a lightning receptor of the LPS is generally disposed between the up-tower anchor point and the tower support surface;
    a robotic testing device comprising:
    an attachment mechanism configured for positioning about at least a portion of an outer perimeter of a rotor blade of the wind turbine and clamping to the rotor blade, the attachment mechanism comprising a plurality of clamping arms connected at a common point, wherein at least one of the clamping arms articulates at the common point and is moveable to clamp to the portion of an outer perimeter of the rotor blade; and
    a LPS test probe coupled to a robotic end effector, wherein the robotic end effector is moveable to position the LPS test probe in contact with the lightning receptor of the LPS;
    one or more tag lines coupled to the robotic testing device; and
    a remote monitoring and control interface operable to remotely clamp the robotic testing device to the rotor blade and perform the one or more LPS inspection tests,
    wherein the cable is coupled to the up-tower anchor point such that, the robotic testing device is movable to a position at which the LPS test probe contacts the lightning receptor.

2. The system of claim 1, wherein the up-tower anchor point is a winch.

3. The system of claim 1, wherein at least a portion of an inner surface of the arms engages at least a portion of an outer surface of the rotor blade.

4. The system of claim 3, wherein the plurality of arms define an open clamped shape when clamped around the portion of an outer surface of the rotor blade.

5. The system of claim 3, wherein the define a closed clamped shape when clamped around the portion of an outer surface of the rotor blade.

6. The system of claim 1, wherein the robotic end effector comprises an articulating robotic arm that is moveable in a manner to position the LPS test probe in contact with the lightning receptor.

7. The system of claim 1, wherein the remote monitoring and control interface provides remote control of the robotic end effector.

8. The system of claim 1, wherein the robotic testing device further includes at least one camera for remote positioning of the LPS test probe in contact with the lightning receptor.

9. The system of claim 1, wherein the LPS test probe is configured to measure at least one of resistance and continuity of the LPS.

10. The system of claim 1, wherein the up-tower anchor point is disposed on a nacelle of the wind turbine.

11. The system of, A system for performing one or more tasks on a lightning protection system (LPS) of a wind turbine, the system comprising:
    a cable having a first end attached to an up-tower anchor point, the cable extending toward a tower support surface such that a lightning receptor of the LPS is generally disposed between the up-tower anchor point and the tower support surface;
    a robotic testing device comprising:
    an attachment mechanism configured for positioning about at least a portion of an outer perimeter of a rotor blade of the wind turbine and clamping to the rotor blade;
    a LPS test probe coupled to a robotic end effector, wherein the robotic end effector is moveable to position the LPS test probe in contact with the lightning receptor of the LPS;
    one or more tag lines coupled to the robotic testing device;
    a remote monitoring and control interface operable to remotely clamp the robotic testing device to the rotor blade and perform the one or more LPS inspection tests;
    wherein the cable is coupled to the up-tower anchor point such that, the robotic testing device is movable to a position at which the LPS test probe contacts the lightning receptor; and
    wherein the robotic end effector comprises two or more cooperatively engaged extendable end effector arms that are extendable in a manner to position the LPS test probe in contact with the lightning receptor.

12. A system for performing one or more inspection tests on a lightning protection system (LPS) of a wind turbine, the system comprising:
- a cable having a first end attached to an up-tower anchor point, the cable extending toward a tower support surface such that a lightning receptor of the LPS is generally disposed between the up-tower anchor point and the tower support surface;
- a robotic testing device comprising:
- a plurality of clamping arms configured to be positioned about at least a portion of an outer perimeter of a rotor blade of the wind turbine, the plurality of clamping arms connected at a common point, wherein at least one of the clamping arms articulates at the common point and is moveable to clamp to the portion of an outer perimeter of the rotor blade, and wherein at least a portion of an inner surface of each of the plurality of clamping arms engages at least a portion of an outer surface of the rotor blade; and
- a LPS test probe coupled to a robotic end effector, wherein the robotic end effector includes remote actuation to position the LPS test probe in contact with the lightning receptor of the LPS;
- one or more tag lines coupled to the robotic testing device; and
- a remote monitoring and control interface operable to clamp the robotic testing device to the rotor blade, control the end effector and perform one or more LPS tests,
- wherein the cable is coupled to the up-tower anchor point such that, the robotic testing device is movable to a position at which the LPS test probe contacts the lightning receptor.

13. The system of claim 12, wherein the plurality of clamping arms define an open clamped shape when clamped around the portion of an outer perimeter of the rotor blade.

14. The system of claim 12, wherein the plurality of clamping arms define a closed clamped shape when clamped around the portion of an outer perimeter of the rotor blade.

15. The system of claim 12, wherein the robotic end effector comprises two or more cooperatively engaged extendable end effector arms that are extendable in a manner to position the LPS test probe in contact with the lightning receptor.

16. The system of claim 12, wherein the robotic end effector comprises an articulating robotic arm that is moveable in a manner to position the LPS test probe in contact with the lightning receptor.

17. The system of claim 12, wherein the robotic testing device further includes a camera for remote positioning of the LPS test probe in contact with the lightning receptor.

18. The system of claim 12, wherein the LPS test probe is configured to measure at least one of resistance and continuity of the LPS.

19. A method for performing one or more tests on a lightning protection system (LPS) of a wind turbine, the method comprising:
- coupling a cable at an up-tower anchor point such that a lightning receptor of the LPS is generally disposed between the up-tower anchor point and a support surface;
- displacing the cable toward the support surface;
- coupling a robotic testing device to the cable, wherein the robotic testing device includes one or more tag lines coupled thereto;
- displacing the cable such that the robotic testing device is moved to a position between the up-tower anchor point and the support surface, and adjacent a rotor blade of the wind turbine;
- the robotic testing device including a plurality of clamping arms connected at a common point, the method comprising articulating at least one of the clamping arms at the common point to close the clamping arms and clamp the robotic testing device to the rotor blade of the wind turbine; and
- contacting a LPS test probe of the robotic testing device to the lightning receptor.

20. The method of claim 19, further comprising adjusting a position of the one or more tag lines such that, as the cable is displaced, the robotic testing device is moved to a position at which the LPS test probe contacts the lightning receptor.

21. The method of claim 19, wherein the plurality of clamping arms are configured such that at least a portion of an inner surface of each of a first clamping arm and a second clamping arm contact at least a portion of an outer perimeter of the rotor blade.

22. The method of claim 19, wherein the plurality of clamping arms are moveable to clamp to a portion of an outer perimeter of the rotor blade and define an open clamped shape.

23. The method of claim 19, wherein the plurality of clamping arms are moveable to clamp about an outer perimeter of the rotor blade and define a closed clamped shape.

* * * * *